United States Patent
Poupyrev et al.

(10) Patent No.: US 7,456,823 B2
(45) Date of Patent: Nov. 25, 2008

(54) USER INTERFACE APPARATUS AND PORTABLE INFORMATION APPARATUS

(75) Inventors: Ivan Poupyrev, Tokyo (JP); Eijiro Mori, Tokyo (JP); Carsten Schwesig, Tokyo (JP); Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 406 days.

(21) Appl. No.: 10/456,186

(22) Filed: Jun. 6, 2003

(65) Prior Publication Data

US 2004/0008191 A1 Jan. 15, 2004

(30) Foreign Application Priority Data

Jun. 14, 2002 (JP) ............................ P2002-174493
Dec. 10, 2002 (JP) ............................ P2002-358187

(51) Int. Cl.
G06F 3/041 (2006.01)
G06F 3/044 (2006.01)

(52) U.S. Cl. ..................................... 345/173; 178/18.06

(58) Field of Classification Search .................. 702/120
See application file for complete search history.

(56) References Cited

U.S. PATENT DOCUMENTS

| | | | | |
|---|---|---|---|---|
| 5,262,777 A | * | 11/1993 | Low et al. | 341/20 |
| 5,396,265 A | * | 3/1995 | Ulrich et al. | 345/158 |
| 5,418,760 A | * | 5/1995 | Kawashima et al. | 368/69 |
| 5,543,588 A | * | 8/1996 | Bisset et al. | 178/18.06 |
| 5,602,566 A | * | 2/1997 | Motosyuku et al. | 345/684 |
| 5,729,249 A | * | 3/1998 | Yasutake | 345/173 |
| 6,121,960 A | * | 9/2000 | Carroll et al. | 345/173 |
| 6,182,010 B1 | * | 1/2001 | Berstis | 701/211 |
| 6,243,074 B1 | | 6/2001 | Fishkin et al. | |
| 6,243,075 B1 | | 6/2001 | Fishkin et al. | |
| 6,268,857 B1 | * | 7/2001 | Fishkin et al. | 715/863 |
| 6,297,805 B1 | | 10/2001 | Adler et al. | |
| 6,297,838 B1 | * | 10/2001 | Chang et al. | 715/863 |

(Continued)

FOREIGN PATENT DOCUMENTS

JP 06-004208 1/1994

(Continued)

OTHER PUBLICATIONS

Zhai et al., "Human Performance Evaluation of Manipulation Schemes in Virtual Environments", Proceedings of IEEE Virtual Realty Annual International Symposium, Sep. 1993, pp. 155-161.

(Continued)

*Primary Examiner*—Sumati Lefkowitz
*Assistant Examiner*—Srilakshmi K Kumar
(74) *Attorney, Agent, or Firm*—Bell, Boyd & Lloyd LLP

(57) ABSTRACT

A user interface apparatus has a flexible part including a one-dimensional analog sensor for sensing distortion of the flexible part, and a processor unit for detecting one of input states based on a value of the detected distortion and having a task run. The task relates to a selected input state. The input states are related to dynamic or static positive/negative distortion of the flexible part. The user interacts with the apparatus by physically manipulating a body of the apparatus.

42 Claims, 24 Drawing Sheets

U.S. PATENT DOCUMENTS

| | | |
|---|---|---|
| 6,317,144 B1 | 11/2001 | Pabla et al. |
| 6,597,347 B1 * | 7/2003 | Yasutake .................... 345/173 |

FOREIGN PATENT DOCUMENTS

| | | |
|---|---|---|
| JP | 7-64754 | 3/1995 |
| JP | 08-123760 | 5/1996 |
| JP | 08-194667 | 7/1996 |
| JP | 10-24034 | 9/1998 |
| JP | 11-039093 | 2/1999 |
| JP | 11-143606 | 5/1999 |
| JP | 11-312040 | 9/1999 |
| JP | 2000-207088 | 7/2000 |
| JP | 2002213989 | 12/2007 |

OTHER PUBLICATIONS

Rekimoto et al., "Tilting Operations for Small Screen Interfaces" Proceedings of UIST'96, 1996, pp. 167-168.

Balakrishnan et al. "Exploring Interactive Curve and Surface Manipulation Using a Bend and Twist Sensitive Input Strip", Proceedings of Symposium on Interactive 3D graphics, 1999, pp. 111-118.

Fishkin et al., "Embodied User Interfaces for Really Direct Manipulation", Communication of the ACM, 2000, 43(9), pp. 74-80.

Office Action issued by the Japanese Patent Office on Apr. 10, 2007 for corresponding Japanese application 2002-358187.

* cited by examiner

F I G. 5
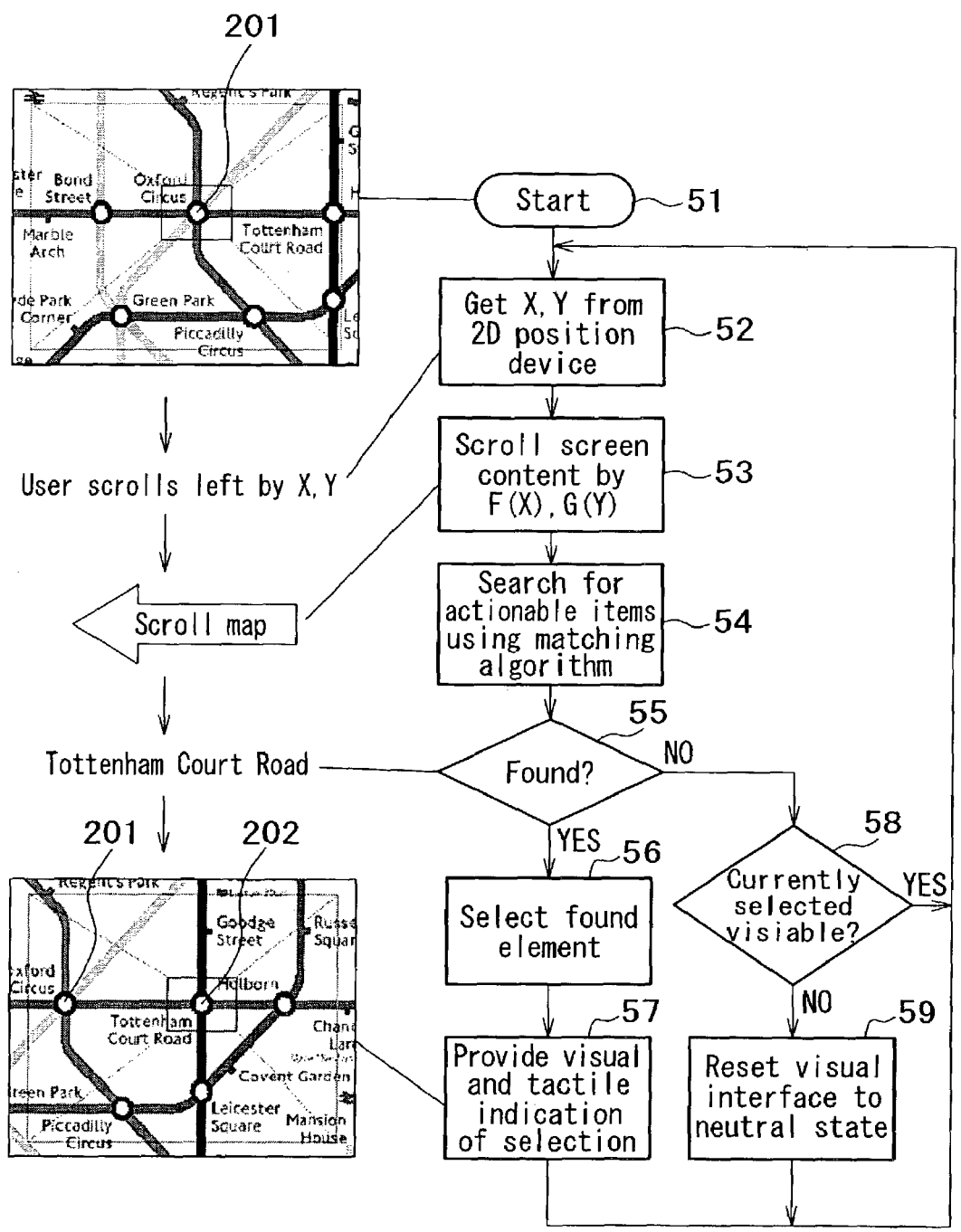

F I G. 1 5 (A)
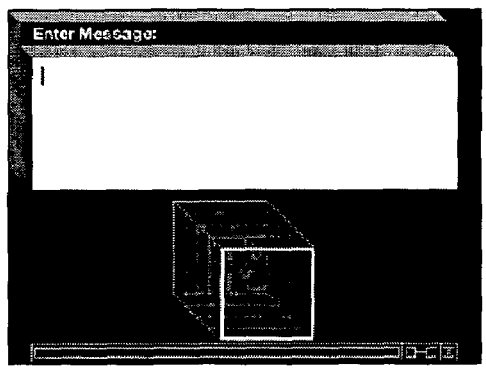
F I G. 1 5 (B)
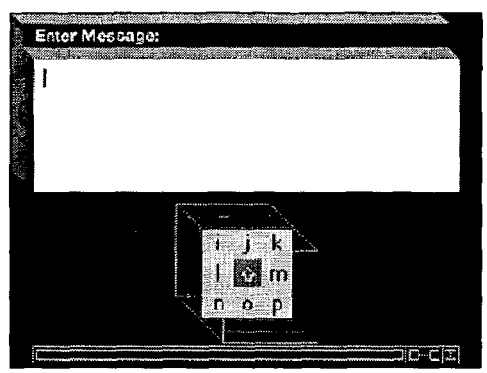
F I G. 1 5 (C)
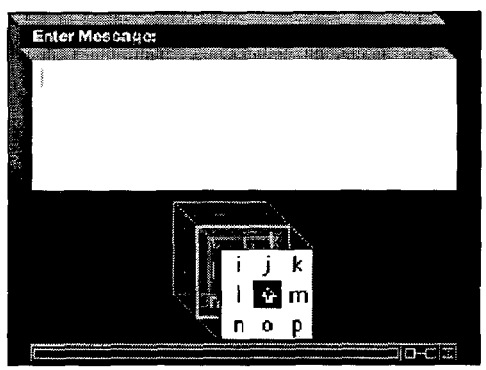
F I G. 1 5 (D)
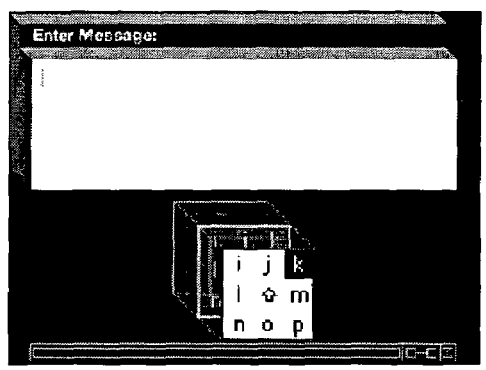
F I G. 1 5 (E)
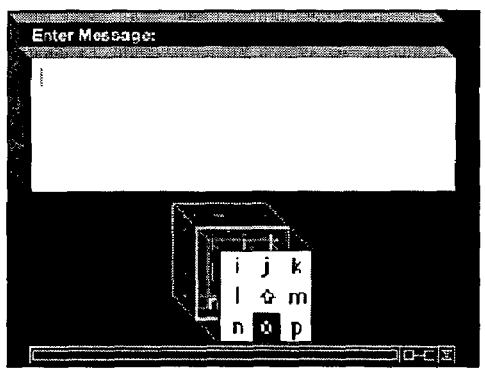
F I G. 1 5 (F)
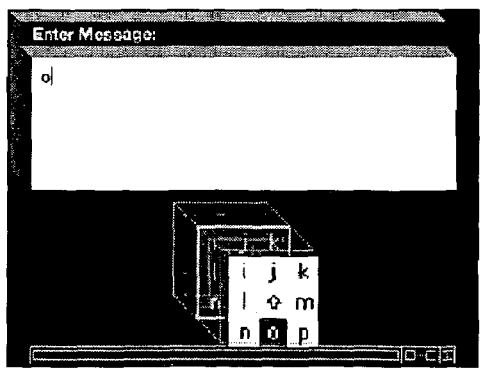

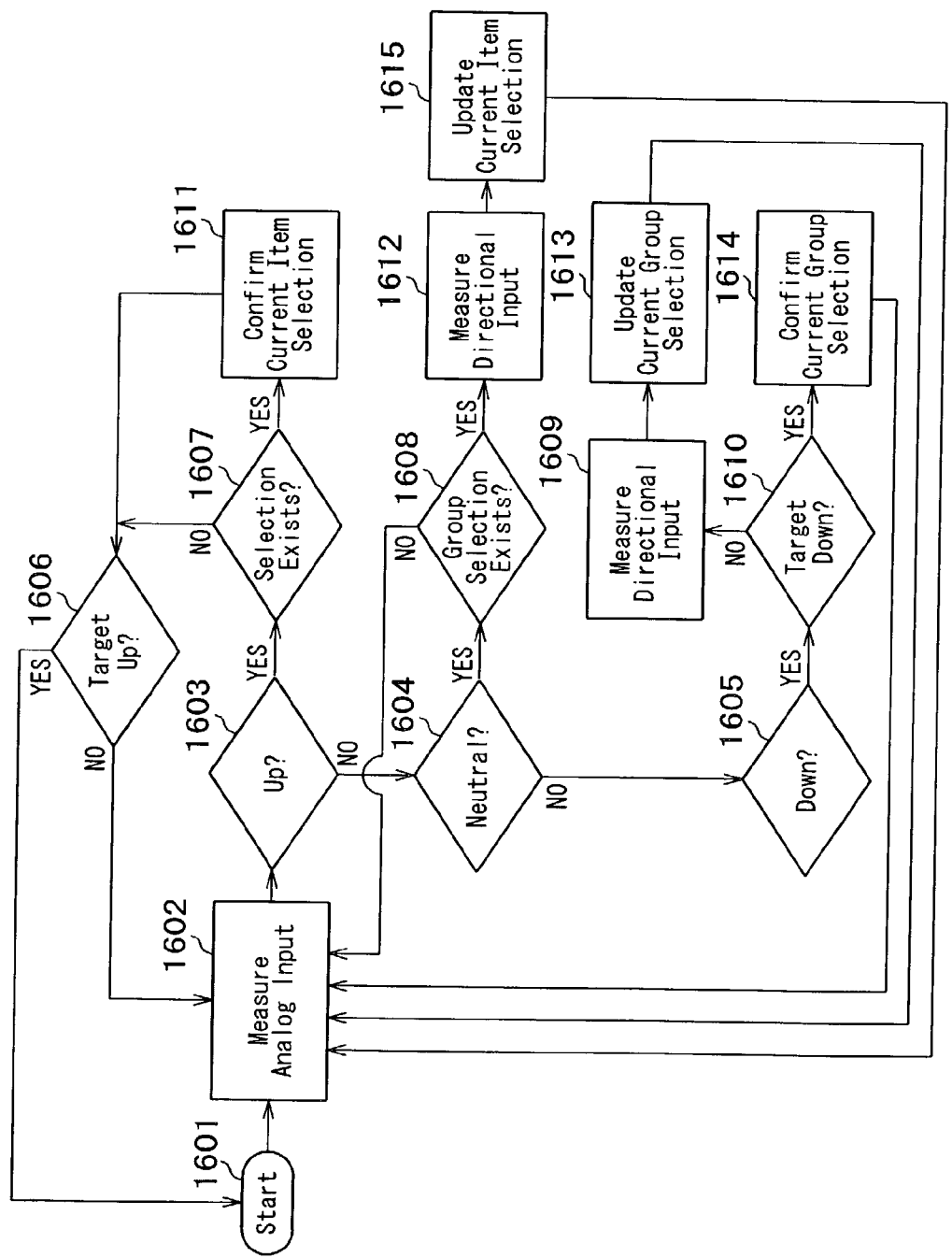

F I G. 2 7
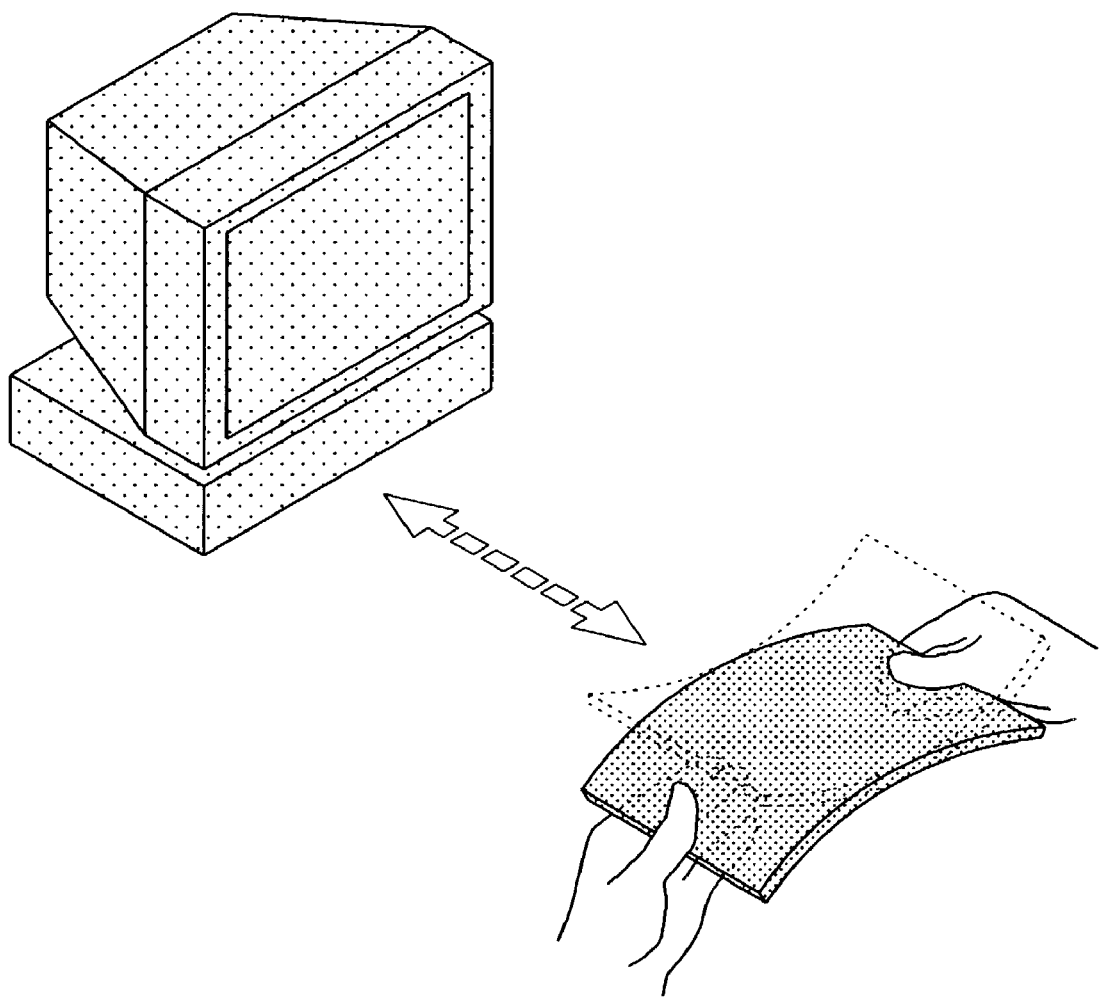

USER INTERFACE APPARATUS AND PORTABLE INFORMATION APPARATUS

BACKGROUND OF THE INVENTION

The present invention relates to a user interface apparatus and a mobile information apparatus that employ such a user interface apparatus. More specifically, the present invention relates to data input technique and interface technique applicable to a mobile apparatus or apparatus having neither keyboard nor mouse.

The present invention relates to a portable information apparatus that provides predetermined information service in response to input operations performed by a user. Specifically, the present invention relates to a portable information apparatus that operates in response to a user input obtained via an input device provided with the apparatus of the standard configuration.

More specifically, the present invention relates to a portable information apparatus that allows the user to perform a complex input operation with rather simpler user actions, and particularly to a portable information apparatus provided with a physical user interface that accepts physical gestures of the user, thereby simplifying the input operation.

In one aspect of the conventional input techniques, significant problems with new mobile and handheld devices are difficulties of effective interaction with the device. The input capabilities of mobile devices are usually limited to pen input and touch screens, buttons and jog-dials type of controllers.

The problem with these input techniques is that the touch screens, which occlude the screen, often require use of pen, but the use of pen is often difficult because of the limited resolution of the touch sensors. Interaction with touch screens also promotes interaction style based on direct sequential manipulation of GUI interface objects: for example, to zoom into map, a user has to sequentially repeat scrolling, pointing and zooming operations.

An alternative device has been proposed that would help to create small while simple to use and mobile apparatuses. For example, devices that accept user's physical interactions to a body of the device are disclosed in Japanese Patent Applications JP 11-143606 and JP 07-64754. The physical interactions include the changing a shape of deformable part or tilting of the device.

Although such devices have been presented, there is not much attempt to develop a graphical user interface that would take advantage of these devices. There is little exploration on how such interface would be useful in basic interface tasks such as data scrolling, navigation, browsing and so on.

Most of the portable devices currently use conventional data input and user interface techniques that have been either replicated from desktop graphical user interfaces or attempt to extend them. One example of the conventional data input and interface techniques is disclosed in Japanese Patent Application JP 2000-207088. These techniques are usually based on using pen and mouse and mostly inappropriate to small handheld devices such as mobile or portable apparatuses.

For example, conventional interactions with GUI interfaces, such as those used on desktop computers and PDAs, is based on the concept of cursor or pointer. The cursor and pointer are graphical representation of the current position on a display screen. To change the current position, e.g. to select a different actionable item, the user has to use input devices such as mouse or keyboard to directly specify one of GUI element on the screen as shown in FIG. 1(A). In the present specification, such task is referred to as pointing or selecting.

In some cases, a desired element may not be visible on the screen and requires the user to scroll the content to find it. Such scrolling of content is a separate task from the pointing (selecting) described above. The scrolling usually requires either a) special user interface elements, such as scroll bar or b) switching of interface modes, e.g. in current GUI when cursor reaches the limits of the visual content area, the content starts scrolling down. Typically, in the conventional interface method, moving of a pointer and pressing of the mouse button as shown by numerals 1 and 2 of FIG. 1(B) trigger these operations. These pointing (selecting) and scrolling methods are particularly inefficient and difficult to use in the device with a small display screen.

Another aspect of the conventional input techniques is described below.

Human hands are excellent tools. Various complex operations can be accomplished while effectively controlling a number of freedom the hands and fingers posses. For example, a musician such as a violinist can apply two different types of tensions on strings at the same time by moving a bow in two different directions (for example, along the string and across the strings).

Similarly, a position and a force may be simultaneously inputted in a computer screen by using an input devices such as a mouse and a pen. For example, in the screen, a button may be pressed while pointing a particular position by the mouse, or pressing a pen down on a tablet.

In a paper presented by S. Zhai and P. Milgram (Human performance evaluation of manipulation schemes in virtual environments: Proceedings of VRAIS'93. 1993. IEEE. pp. 155-61), it is suggested that a position control (isotonic control) and a force control (isometric control) are manual controls with different physiological and physiological mechanisms, and directions of these controls are, in basic sense, orthogonal to each other for human beings.

Difficulty of data input and lack of effective interaction in a portable or hand-held type apparatuses are know for a long time and are very important issues. Typically, input functions in these portable apparatuses are limited to, for example, a pen input via a touch screen, buttons or jog-dial type controllers. In case that the touch screen is used, there are some difficulties such that the pen may occludes display contents of the screen, or the pen may be required too often for the interaction, or an accurate pen input becomes impossible because of resolution limitation in the touch screen.

The interactions via the touch screen is only recommended for a specific instruction such that successive direct operations are performed on GUI interface objects, such as successively applying functions of scrolling or zooming for viewing and zooming a map. If such an input operation is realized in a single gesture, the operation may be drastically simplified and burden on the user may be eased.

There are some suggestions regarding physical user interactions for realizing various tasks such as performing all of the computer operations by applying user's physical gestures on a portable computer. For example, the above-mentioned JP 11-143606 discloses a portable apparatus, which includes a feed back module for displaying information regarding data structure processed and a detector for detecting a user's manual operation, for modifying a display form of the data structure in response to the manual operation. The above-mentioned JP 07-64754 discloses a small information processing apparatus that can be held in single hand and make scrolling of a display in accordance with an inclination of the apparatus. In these apparatuses, interfaces are controlled by detecting user's actions applied on the apparatuses with sensors provided therein.

Rekimoto, J (Tilting operations for small screen interfaces; Proceedings of UIST'96. 1996. ACM. pp. 167-168) discloses a small display interface to be used for scrolling information display by detecting an inclination of an apparatus with a tilt sensor. However, these interfaces are focused on realization of only certain functionalities. In other words, the physical interactions to the computers are considered as asynchronous ones. If an action is performed, another user action would follow. No research has been made on an apparatus that can transparently combine and use a plurality of gestures.

Balakrishnan, R., G. Fitzmaurice, G. Kurtenbach, K. Singh (Exploring interactive curve and surface manipulation using a bend and twist sensitive input strip; Proceedings of Symposium on Interactive 3D graphics. 1999. ACM. pp. 111-118) and U.S. Pat. No. 5,396,265 disclose a flexible interface in which a rotation sensor is utilized to detect bending of sensing portions that are mechanically connected to each other. However, the disclosed interface focuses only to work of creating forms but not suggesting a general-purpose interface that can be applied to portable apparatuses or any other general apparatuses.

Further, there is physical interactions available for a desktop computer using a force detection device such as a space ball. However, applications of such physical interactions are limited to, in general, a navigation application in three-dimensional space.

With regard to the first aspect of the conventional input techniques, there are several attempts to investigate new types of interfaces and data input techniques suitable for mobile apparatuses. However, most of these investigations have been focused on a single task such as 3D data control (Balakrishnan, R., Fitzmaurice, G., Kurtenbach, G., Singh, K., "Exploring interactive curve and surface manipulation using a bend and twist sensitive input strip", Proceedings of Symposium on Interactive 3D graphics, 1999, ACM. pp. 111-118), or data scrolling (Rekimoto, J., "Tilting operations for small screen interfaces", Proceedings of UIST'96. 1996. ACM. pp. 167-168) or others (Fishkin, K., et al., "Embodied user interfaces for really direct manipulation", Communications of the ACM, 2000. 43(9): p. 74-80).

Furthermore, text input using conventional mobile or handheld devices are rather problematic in the following point. That is, input capabilities of mobile devices are usually limited to pen input and touch screens, buttons and jog-dials type of controllers. For text input, there are currently three widely used techniques: keyboard (on screen or as a physical array of buttons), number-pad input on mobile phones and gesture-based systems such as Palm Computing's Graffiti (product name). Of these, the number-pad text input technique may be the most widely used. However, such technique has some disadvantages since it requires multiple button presses for the input of each character.

All the above conventional techniques become more difficult to use as the size of the devices becomes smaller. The need for the physical buttons limits the miniaturization of portable computing devices. The touch screens are problematic on small devices because of their limited sensing resolution and because the user may occlude the screen during the input operation.

Furthermore, existing computer input devices such as mouse and pen interfaces allow various input operations, e.g. pressing button on the mouse or pressing pen on the tablet. However, external input devices are needed, which may be problematic in very small devices.

SUMMARY OF THE INVENTION

The present invention is conceived in view of the above described conventional user interface and data input techniques. It is desirable to provide data input and interface means for an apparatus where the user interacts with the apparatus by physically manipulating a body of the apparatus, and/or an apparatus including a visual display and such data input and interface means.

Furthermore, it is desirable to provide a graphic user interface means that enable a user to perform a range of tasks without using button, pen or any other mechanical controller, and/or an apparatus including a visual display and such graphic user interface means.

Furthermore, it is desirable to provide data input and interaction means for an apparatus including a two-dimensional position sensor and one-dimensional analogue sensor to detect user's operations to command the apparatus to perform tasks. In the present specification, the task refers to a particular mode of operation such as scrolling of image displayed on a screen, selecting a part of the displayed image and the like.

Furthermore, it is desirable to provide graphical user interface means for an apparatus including a two-dimensional position sensor and one-dimensional analogue sensor to input text or make selection from a menu/list.

According to an embodiment of the present invention, a user interface apparatus having a flexible part is provided. The user interface apparatus includes an analog sensor for sensing distortion of the flexible part, and means for detecting one of a plurality of first-type input states based on a value of the distortion sensed by the analogue sensor and having a task run, the task being related to a selected first-type input state. In the present embodiment, at least one of the plurality of first-type input states is related to one of dynamic and static positive distortion of the flexible part; at least one of the plurality of first-type input states is related to one of dynamic and static negative distortion of the flexible part, and the plurality of first-type input states are respectively related to different distortion statuses of the flexible part.

In the present embodiment, one of the first-type input states may be related to a neutral state of the flexible part in which no distortion is detected. It is preferable that at least one of the tasks is for controlling the graphical user interface object.

The user interface apparatus of the present embodiment may further include a two-dimensional position sensor for sensing at least one of a user touch position in a two-dimensional plane and a direction of movement of the user touch position, and means for detecting a second-type input state related to the user touch position sensed by the two-dimensional position sensor and having a task run, the task being related to a selected second-type input state. Furthermore, it is preferable that at least one of the first-type input states is a transition state corresponding to a task that performs analog control of a graphical user interface object.

It is preferable that the user interface apparatus is configured as an electric device of a single body including a flexible display panel as the flexible part, and the two-dimensional position sensor is disposed on the back of the flexible display panel. It is also preferable that at least one of the tasks related to the second-type input state is for controlling at least one of the moving direction and position of the graphical user interface object. Alternatively, such task related to the second-type input state may be used for controlling any geometrical transformation of the graphical user interface object or any other graphical objects associated therewith, such as scaling, rotation, projection and so on.

According to another embodiment of the present invention, an apparatus configured to have a single body including a processing unit and a display unit is provided. The apparatus includes an analog sensor disposed on the body for detecting user's analogue input applied on the body of the apparatus. The processing unit changes a screen view displayed on the display unit based on an output value of the analogue sensor.

In the present embodiment, the screen view to be changed may include an image superposed on an existing view, and the processing unit may change one of visual properties of the superposed image in accordance with the output value of the analogue sensor. Alternatively, the screen view to be changed may include an image that enables to provide a visual impression to a user that the image indicates selectable items and an item selected, and the processing unit may change selectable items and an item selected included in the image in accordance with the output value of the analogue sensor.

Furthermore, in the present embodiment, the apparatus may further include scroll means for controlling scrolling of the screen view in accordance with user's input. The processing unit may select one of selectable graphic user interface elements displayed in a current screen view by detecting if a position of the graphic user interface element is reached to a predetermined position of a screen of the display unit, and switches a mode of operation so as to accept a user input for confirming selection of the detected element.

According to still another embodiment of the present invention, graphical user interface and data input techniques are provided. The interface and data input techniques of the present embodiment are suitable for an apparatus with display, such as mobile or hand-held computing apparatuses, PDAs, mobile phones, etc., that are based on the use of two-dimensional positioning input with one-dimensional analogue input.

These data input may be obtained by using two types of sensors: two-dimensional (2D) position sensor and one-dimensional (1D) analogue sensor. The interface technique enables the user to command a number of common tasks such as data navigation, menu selection, etc. The two-dimensional position sensor may be disposed on the back of the display screen or any other position that does not interfere the display screen. The two-dimensional position sensor may include a touch panel or any other device that enables to detect two-dimensional input operation applied by the user.

The 1D analogue sensor and the 2D position sensor may be integrated into the apparatus itself. In the present embodiment, the user interacts with the apparatus by manipulating the apparatus itself rather then using separate input devices and controls, and the user observes visual outputs on a screen of the display. Typical examples of the apparatus according to the present embodiment may be:

a) Apparatus including a flexible visual display for presenting information to the user with a single or multiple bending sensors embedded into the apparatus, that measure bending in one or multiple points;

b) Apparatus including a non-flexible visual display for presenting information to the user with pressure sensors or force sensors attached to the apparatus itself, that measure multiple directions of user force applied to the apparatus;

c) Apparatus according to apparatus a) or b) with additional flexible (or non-flexible) single or multiple point touch-sensitive two-dimensional position sensors attached to the apparatus.

One of key features of the present embodiment is that the interfaces that are not based on a mouse and buttons but on physical manipulating of the body of the apparatus, such as bending, touching, sliding, positioning and the like. The present embodiment presents simple interaction techniques that allow designing a simple and yet consistent interface for such interaction paradigm.

According to another embodiment of the present invention, a data selection technique for the interface of the previous embodiment is provided. The data selection technique of the present embodiment integrates functions of data selection and data scrolling/navigation. The technique allows the user to select interface elements displayed on the screen by scrolling the entire content on the visual display, i.e. images and/or text, in one or two direction using the 2D position sensors attached to the apparatus. Actionable interface elements are selected according to a particular algorithm (matching algorithm). Appropriate visual, audio and tactile feedback may also be provided when the selection is performed.

According to still another embodiment of the present invention, a selection confirmation technique for the interface according to the embodiments described above is provided. In the present embodiment, the selection confirmation may be accomplished by using the 1D analogue sensor, when the selection and interaction is executed by using one of the following methods:

a) By detecting if the output value from the 1D analogue sensor reaches a threshold value, the technique enables the user to select any interface data item, e.g. pressing a graphics button, or selecting command from the list or choosing link in the web browser;

b) By detecting if the output value from the 1D analogue sensor reaches a positive or negative threshold value by using two directions of the 1D analogue sensor independently. For example, it can be used to navigate back and forward in the hierarchical structure, e.g. file structure, menu structure or hyperlinked content. This may be done by defining negative and positive input directions on the 1D analogue sensor. For example, bending in one direction may be used to move down in the hierarchy and bending in the opposite direction may be used to move back up in the hierarchy;

c) By using techniques according to the methods a) and/or b), but producing a smooth analogue transition between views of the interface (e.g. show next page, or show the dialog window) before the selection is confirmed. The transition may be controlled by the output value from the 1D analogue sensor. It is preferable that, during the visual transition, both current and next interface views are visible at the same time.

Alternatively, the interface and data input technique of the embodiment described above may be used to preview additional information attached to a user interface element by using the 1D analogue sensor with the selection confirmation technique of embodiment described above. The attached interface element may be, for example help data. The transparency and/or zooming techniques described above may be used with the 1D input sensor to display the additional information.

Furthermore, the user interface and data input techniques according to the above-described embodiment may be used for simultaneous zooming and viewpoint control on visual data, or for a three-dimensional navigation in a three-dimensional user interfaces. The apparatus according to the above-described embodiments may be provided with tactile display for tactile feedback.

In the above-described embodiments, the 2D position sensor is used to provide the 2D position input. Alternatively, the 2D position sensor may be replaced with any other type of sensor that can control the scrolling if the 2D position input is used for scrolling the screen view. For example, a tilt sensor including accelerometers may be used to detect a tilt of the apparatus so that the user may control the speed and direction of scrolling by tilting the apparatus to a certain direction and amount.

According to still another embodiment of the present invention, graphical user interface control techniques are provided. The graphical user interface control techniques of the present embodiment allow selection from a three-dimensional array displayed on a visual display combining two-dimensional positioning input and analog input. The graphical user interface control techniques may be used for text input and for menu/list systems.

The graphical user interface control techniques of the present embodiment are suitable for mobile computing apparatuses (e.g. PDA's, mobile phones etc.). The graphical user interface control techniques allow the selection of a group of items, followed by the selection of a single item from the current selected group, followed by confirmation or cancellation of the current selection. The selections are made using one of several possible combinations of simultaneous or discreet analog input and 2D positioning input.

According to another embodiment of the present invention, an apparatus configured to have a single body including a processing unit and a display unit is provided. The apparatus includes an analog sensor disposed on the body for detecting user's analogue input applied on the body of the apparatus. The processing unit includes an image processing unit having a plurality of operation modes to generate a screen view displayed on the display unit. The processing unit controls functionality of at least one of the operation modes based on an output value of the analogue sensor. For example, the image processing unit may include a moving picture replay operation mode, and the analogue output may be used to control the speed of replay operation.

According to still another embodiment of the present invention, an apparatus including a user interface unit is provided. The user interface unit includes the user interface apparatus or utilizes the user interface techniques in accordance with any one or combinations of the embodiments described above. The user interface unit further includes one or more additional input devices. The additional input device may be input devices using keyboard/button/switch, pointing device, mouse, touch-screen, voice-controller, remote-controller, joystick, and the like.

In view of the second aspect of the conventional input techniques, it is desirable to provide a portable information apparatus that allows the user to perform a complex input operation with rather simpler user actions.

Further, it is desirable to provide a portable information apparatus provided with a physical user interface that accepts physical gestures of the user, thereby simplifying the input operation thereof.

It is also desirable to provide a portable information apparatus capable of transparently combining a plurality of gestures performed by the user and accepting these combined gestures as an input to the apparatus.

Further, it is desirable to provide a portable information apparatus that can use physical interactions with the apparatus as a general-purpose interface to the apparatus.

According to still another embodiment of the present invention, there is provided a portable information apparatus operated in response to a user input. The apparatus includes a main body, gesture input means for obtaining physical interaction applied on the main body by a user, and processing means for executing processing in accordance with the user input. For example, by detecting gestures such as bending or distorting the main body of the apparatus, the user can operate the apparatus intuitively in accordance with his or her feeling or impulse, thereby more efficient physical interactions may be performed.

The portable information apparatus according to the present embodiment may further include a visual display, which is placed in a front surface of the main body, for visually displaying a result of the processing by the processing means, and direction input means, which is placed in a back surface of the main body, for inputting a direction or coordination (position) in a display screen of the visual display in response to an operation performed with a user's finger.

The portable information apparatus according to the present embodiment may further include a tactile presentation section for providing a tactile feedback indicating a processing result obtained in the processing means. In such a configuration, it is possible to provide the tactile feedbacks to the user regarding a level of the physical interaction successfully applied on the main body of the apparatus using the gesture input means or the number of times of such physical interactions.

The gesture input means may include, for example, operation sections that are turnably connected to both right and left edge portions of the main body, respectively, a rotation sensor for detecting an operation amount of turning of the operation section with respect to the main body; and a data acquisition section for providing an output of the rotation sensor, as a gesture input, to the processing means.

According to such a configuration, the user can hold the right and left operation sections and bend them with respect to the main body of the apparatus. The amount of bending detected by the rotation sensor is detected as the gesture input. Such a gesture of bending the operation section with respect to the main body of the apparatus can be performed intuitively in response to his or her feeling or impulse, and is an efficient physical interaction.

Further, such a gesture input may be performed while confirming display contents of the visual display. Still further, the display screen would not be occluded since the user performs the gesture input while gripping right and left edge portions of the main body of the apparatus. The user can input a two dimensional coordinate by scanning the back surface of the apparatus while simultaneously confirming visual contents displayed on the display screen placed in the front surface thereof. With this configuration, the finger of the user indicating the two-dimensional coordinate would not block visibility of the display screen of the visual display. Further, a GUI operation screen may be set up in the visual display of the front surface side. The GUI operation on the visual display may be performed in conjunction with the two-dimensional coordination input detected by the touch sensor of the back surface side by displaying a cursor in the GUI operation screen in response to a position designated by the coordination input.

Alternatively, the main body of the apparatus may be configured with a flexible body, and the gesture input means may include a bend sensor for detecting an amount of bend in the main body caused by the physical interaction by the user and a data acquisition section for providing an output of the bend sensor, as a gesture input, to the processing means. The bend sensor may detect a direction and amount of bending in the main body. These detected direction and amount of bending may be combined and mapped to data or command in a computer. In such a configuration, the main body of the apparatus changes its external shape. Accordingly, a flexible display such as an organic EL device may be utilized in the visual display, and a flexible electrostatic capacitor type mesh sensor may be utilized in the touch sensor.

Alternatively, the gesture input means may include operation sections attached to both right and left edge portions of the main body, respectively, a force sensor for detecting force applied to cause distortion in the operation section with respect to the main body, and a data acquisition section for providing an output of the force sensor, as a gesture input, to the processing means. In this case, the force sensor can make a detection if the user applies force on the apparatus so as to distort the main body thereof. The detection result is used as the gesture input.

Alternatively, the gesture input means may include a pressure sensor for detecting force applied to cause distortion in the operation section with respect to the main body; and a data acquisition section for providing an output of the pressure sensor, as a gesture input, to the processing means. For example, if the user hold an edge portion of the main body by pinching between a thumb and an index finger, and applies force so as to distort the main body, the pressure sensor detects the pressure applied by the thumb as the gesture input.

Alternatively, the force sensor may be placed both the front and back surfaces of the main body so as to detect, not only a strength of the force, but also a direction in which the user's physical interaction is applied. In other words, the detection may be made on if the bending of the main body is directed upward or downward.

The processing means may be perform simultaneous and transparent processing of the gesture input from the gesture input means and the direction input from the direction input means. According to such a configuration, the processing means may perform processing, which corresponds to the physical interaction accepted by the gesture input means, to an object in the display screen, where the object is designated by using the direction input means. For example, it is possible to perform interactions such that a map displaying position is scrolled in response to the coordination input detected by using the direction input means while a display scale of the map is switched in response to the gesture input (for example, zooming with an increase of an amount of physical operation).

Alternatively, the gesture input means may include a force sensor for detecting a strength of the physical interaction applied on the main body by the user, and the processing means may use an output of the force sensor, which is a continuous variable, as an analog value for interface control. Further, a tactile presentation section may be provide for providing a tactile feedback to the user, the tactile feedback indicating the analog value accepted by the gesture input means.

Alternatively, the processing means may control a system operation in response to an output of the force sensor if the output of the force sensor exceeds a predetermined threshold by issuing a command to the system, switching interface condition or operational mode, executing any other GUI operation or the like. Further, a tactile presentation section may also provided for providing a tactile feedback to the user so as to confirm validity of the physical interaction accepted by the gesture input means. For example, the user may perform a physical interaction to select a desired element in a menu by using the direction input means and to bend the main body of the apparatus. If a force applied through the physical interaction is detected to be equal or greater than a predetermined threshold, a corresponding menu command is executed.

Alternatively, the processing means may use a pattern of the force detected by the force sensor as a specific command. For example, various gestures may be generated by bending the main body in the same direction or the opposite direction, or bending at different time, or bending with a predetermined interval. Each of these various gesture patterns may be assigned to a different command of the system operation.

Further, successful interpretation of the physical interaction accepted by the gesture input means and successful execution of the corresponding command may be notified to the user by using the tactile feedback.

The embodiments described above may provide a computer interface capable of simultaneously interfacing the coordination input and the force input. Such capability of simultaneously accepting multi-dimensional user inputs promotes usability and provides more variations of interactions. Such combination of the user inputs is advantageous, particularly for a hand-held type or portable type computers, and allows the user to perform a variety of interactions. According to such an interface, the user may realize interactions regarding different orthogonal information with single gesture. For example, the single gesture may realize an interaction of scrolling a city map while simultaneously changing a scale of the map.

Additional features and advantages of the present invention are described in, and will be apparent from, the following Detailed Description of the Invention and the figures.

BRIEF DESCRIPTION OF THE FIGURES

FIG. 5 is a view including a flow chart of algorithm for selecting GUI elements by content browsing, and snapshots of a visual screen at steps of the algorithm;

FIG. 15(A) is a view showing a snapshot of a visual screen at a neutral state of the example flow of FIG. 14;

FIG. 15(B) is a view showing another snapshot of a visual screen during group selection in the example flow of FIG. 14;

FIG. 15(C) is a view showing another snapshot of a visual screen at neutral state with default selection in the example flow of FIG. 14;

FIG. 15(D) is a view showing another snapshot of a visual screen during item selection in the example flow of FIG. 14;

FIG. 15(E) is a view showing another snapshot of a visual screen during item selection in the example flow of FIG. 14;

FIG. 15(F) is a view showing another snapshot of a visual screen during item confirmation in the example flow of FIG. 14;

FIG. 16 is a flow chart for an example implementation with nested grids according to the second embodiment;

FIG. 27 is a view showing an application example of the gesture input.

DETAILED DESCRIPTION OF THE INVENTION

FIRST EMBODIMENT (1) System Configuration and Components

Figure 1A:
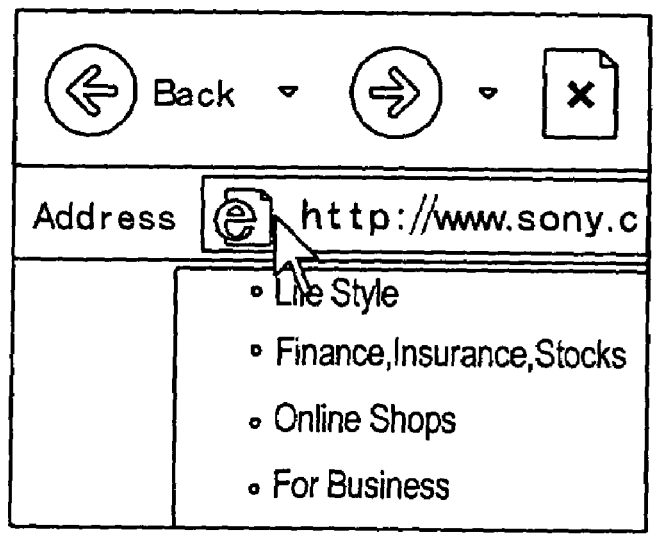
FIG. 1(A) is a view illustrating traditional GUI control techniques for selection of an GUI element on the screen.
Figure 1B:
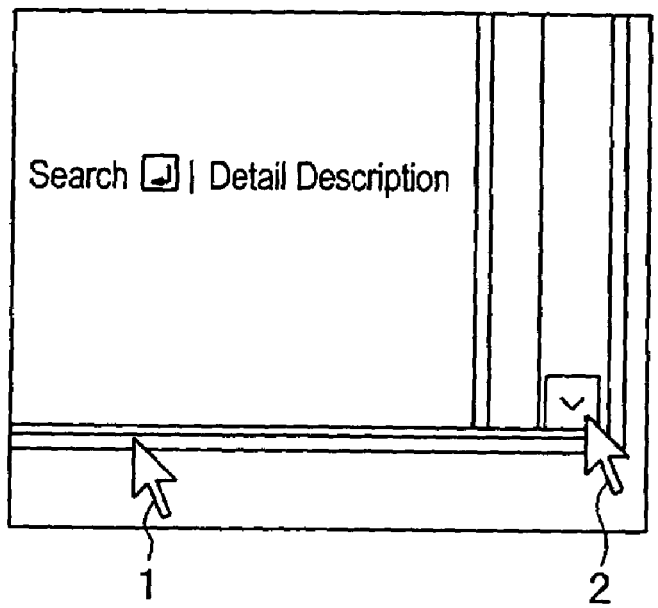
FIG. 1(B) is a view illustrating traditional GUI control techniques for browsing/scrolling information.
Figure 2:
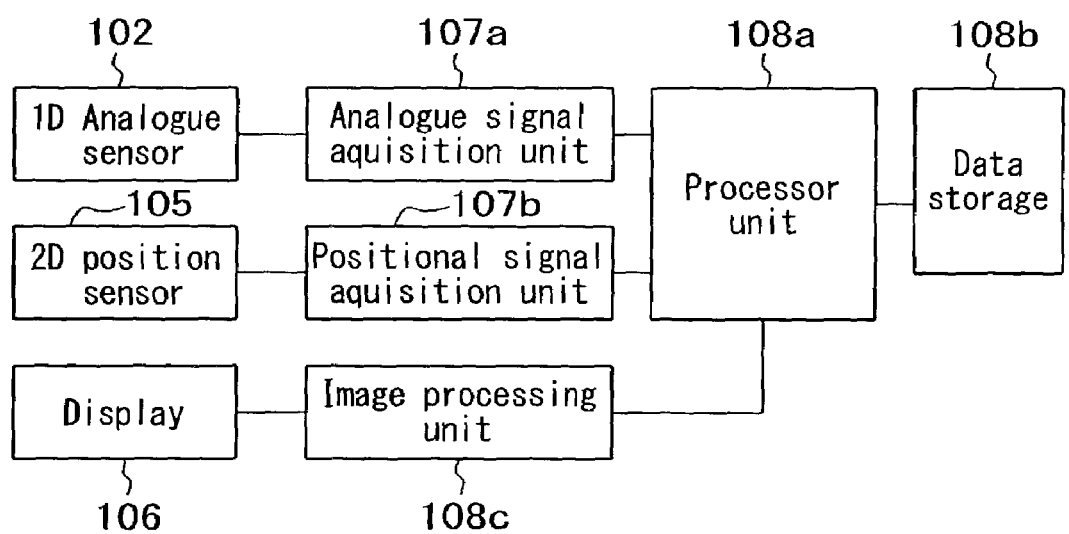
FIG. 2 is a block diagram of an apparatus according an embodiment of the present invention.

FIG. 2 is a block diagram of the mobile apparatus of the present embodiment. The mobile apparatus of the present embodiment includes a one-dimensional (1D) analogue sensor 102, a two-dimensional (2D) position sensor 105, a display 106, an analogue signal acquisition unit 107a, a positional signal acquisition unit 107b, a processor unit 108a, a data storage 108b and an image processing unit 108c.

In the present embodiment, the processor unit 108a may include a processor (CPU), a memory and all necessary units for controlling the information processing, the display 106, and the sensors 102, 105. The mobile apparatus may further include any wired or wireless communication unit for communicating other apparatuses and/or network connections. The user controls the mobile apparatus and inputs data using the 1D analogue sensor and the 2D position sensor. These sensors may be disposed on any positions as long as they do not occlude nor interfere with a screen of the display 106.

Alternatively, a plurality of 1D analogue sensors may be provided to detect physical manipulations of the present mobile apparatus in different directions. For example, a set of 1D analogue sensors may be provided to detect user's bending inputs around x-axis and y-axis separately. It is advantageous to have such set of 1D analogue sensors if the display of the apparatus can be used in both landscape and portrait modes. If the user performs the same bending gesture for both modes, the apparatus can detect in which mode the current bending input is performed.

The 1D analogue sensor produces an analogue change in controller parameter of output signal, such as voltage or resistance, which can be measured. That is, these parameter changes directly correspond to changes in the force applied to the 1D analogue sensor. The 1D analogue sensor may include one or more sensing devices attached to the apparatus. The sensing devices may include a force-sensing device for detecting force applied, a bend sensing device for detecting changes in its shape, a pressure-sensing device for detecting pressure applied, a rotation-sensing device for detecting rotational motion, and any other sensing device for detecting changes generated in association with physical operations applied on the 1D analogue sensor.

In the present invention, the sensing devices are not limited to any specific type, and various types of the sensing devices utilizing electrostatic, electromechanical, magnetic, optical, and combination of these physical properties may be employed if an appropriate parameter can be detected.

The 2D position sensor accepts the user's operations to specify positions of the GUI elements displayed on the display 106 and outputs signals indicating positions or changes in the position. The 2D position sensor 105 may be a 2D tracking sensor, 2D touch sensor, or any other sensor or a group of sensors that capable of detecting two-dimensional changes. The 2D position sensor may include a flexible mesh sensor of electrostatic capacitive type.

The user's input detected by the sensors 102, 105 are captured by the analogue signal acquisition unit 107a and the positional signal acquisition unit 107b, respectively. The data captured by the acquisition units 107a and 107b are processed using the processing unit 108a, information stored in the data storage 108b, and the image processing unit 108c so as to generate corresponding graphical images data such as image data for updated graphical user interface elements. The user's inputs of the present embodiment may be interpreted as events in a conventional object-oriented, event-driven programming language. That is, if an event is detected, an event handler (program) is activated in response to the detected event so as to perform a desired GUI operation.

The information stored in the data storage may include various image or map data elements corresponding to images to be displayed on the display 106. Details of processing steps to be performed in various tasks are described below. Finally, images of the updated graphical user interface elements are presented to the user using the display 106.

Alternatively, tactile display and/or audio display (audio output) may be presented to the user in addition to the visual display. The tactile display and the audio display may be provided for tactile and audio feed back of the user inputs.

Figure 3A:
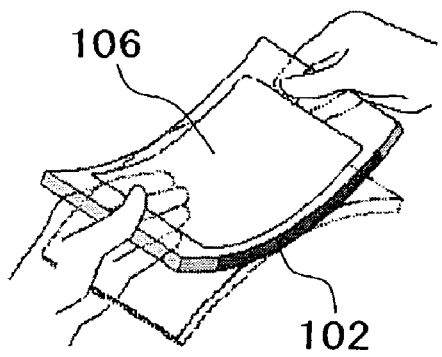
FIG. 3(A) is a perspective view of the apparatus shown in FIG. 2 with a flexible display device, bend sensors and flexible tracking surface on the back.
Figure 3B:
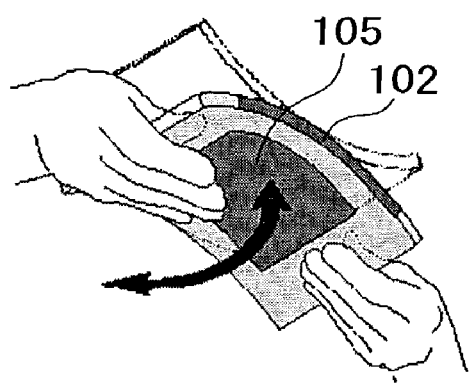
FIG. 3(B) is another perspective view of the apparatus shown in FIG. 2 with the flexible display.

Examples of the mobile apparatus of the present embodiment are depicted on FIGS. 3(A)-(D). FIGS. 3(A) and 3(B) present configuration of the mobile apparatus including a flexible display 106 with embedded bending sensor 102 and a flexible 2D position sensitive panel 105 on the back. FIGS. 3(A) and 3(B) show two shapes of the mobile apparatus in the instant example when forces are applied in the opposite directions.

In the instant example, the flexible display 106, the bending sensor 102 and the flexible 2D position sensitive panel 105 serve as the display 106, the 1D analogue sensor 102 and the 2D position sensor 105, respectively. The flexible display may be a flexible organic electro-luminescence or any display configured with flexible member.

The user interaction with the mobile apparatus may include:

a) bending the entire apparatus up and down, and watching results of inputs detected by the bending sensor 102 on a screen of the flexible display 106;

b) bending the entire apparatus up and down while controlling position of interface elements using the 2D position sensitive panel 105 on the back;

c) bending the entire apparatus up and down in certain patterns that can be recognized by the apparatus and used to issue commands.

d) bending the apparatus to a certain degree and keeping the apparatus bended the amount, the bended amount specifying the speed of changes for certain parameters.

Figure 3C:
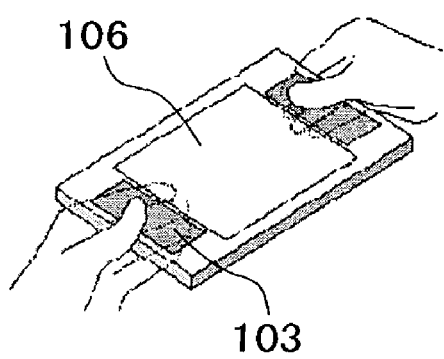
FIG. 3(C) is a perspective view of the apparatus shown in FIG. 2 with non-flexible monitor and a couple of pressure sensors.
Figure 3D:
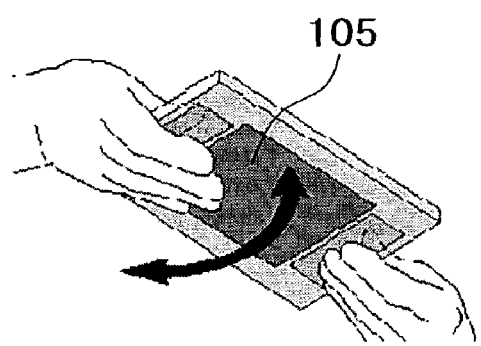
FIG. 3(D) is another perspective view of the apparatus shown in FIG. 2 with the non-flexible monitor.

FIGS. 3(C) and 3(D) illustrate one alternative implementation of this configuration, where the apparatus itself can not be bended, but the user can apply force to the pressure pads 103 located on one or both sides of the apparatus. The user interactions are similar to that of the example shown in FIGS. 3(A) and 3(B), as in both cases the user applies force to the apparatus in a similar way to input data and control the apparatus.

(2) Definitions and Terms Used (2.1) Interpretation of the Data from the 1D Analogue Sensor:

In the present specification, a generic method to refer to data received from the 1D analog sensor is used. As mentioned above, the 1D analogue sensors may be a variety of sensors that return a numerical value proportional to a user input applied to the sensor. Although a variety of sensors or combination of sensors can be used, a force sensor will be used often as the 1D analogue sensor in the following explanation. Furthermore, in the present specification, the 1D analogue sensor may also be referred to as an analogue controller or analogue input device.

Figure 4:
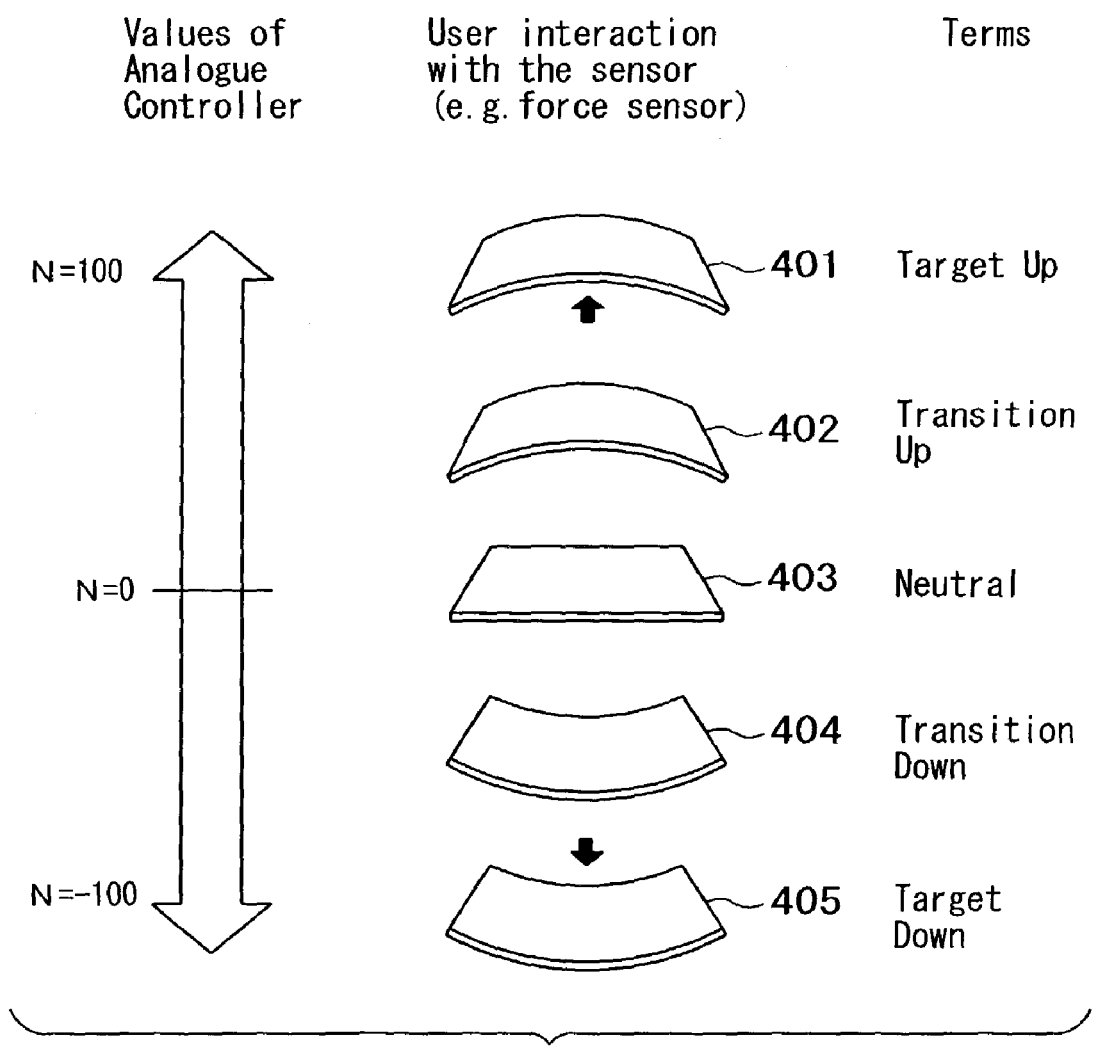
FIG. 4 is a view illustrating states of a 1D analogue sensor and corresponding terms to describe the states.

Suppose, measured values of analogue control variable from the 1D analogue sensor N range within some diapason and we set a certain threshold value, which can be for example −100 or +100. Then, as shown in FIG. 4, the data from the sensor would be interpreted as:

0 (e.g. null): a 'neutral' state of the apparatus (403), i.e. no input from the user is applied.

N =100: the user applied input so that sensor value reaches a threshold or target value. This event is referred to as "target up" (401).

N =−100: the same as above, except the negative threshold value is reached. This event is referred to as "target down" (405).

N changes from 0 to 100: the user moves the analogue controller to change its output value between the neutral and positive threshold values, e.g. in positive transition space. This event is referred to as "transition up" (402).

N changes from 0 to −100: the same as above, except the user moves the analogue controller in negative transition space. This event is referred to as "transition down" (404).

It should be noted that a) some sensors may have only positive space range, for example, pressure sensors can sense data only in one direction; b) combination of sensors can be treated as a single sensor, for example, by combining two pressure sensors the positive and negative directions of input can be detected; and c) combination of one sensor for detecting only an amount of force applied by the user and one switch for detecting direction of the force.

(2.2) On-Screen Interface Elements and Interaction Therewith:

In the present specification, selectable or actionable on-screen elements are used to describe embodiments of the present invention. These are graphical used interface elements that the user can interact with. In most cases, interaction with selectable interface elements consists of two phases.

Phase 1: Selection of the interface element that the user wants to interact with. There are often many selectable interface elements on the visual screen at the same time, hence interface should provide user with tools to specify which element the user wants to interact with. The selection page can be skipped if there is only one controlled interface element at a time.

Phase 2: Interaction. After the user selects the interface element, the user may interact with the selected interface element. The type of interaction can be different and it depends on the type of the interface element. In some cases, the interaction will be a simple confirmation of the selection to execute appropriate action, such as pressing a button, selecting file name from the list to load, or link on the web page to follow. Others can be more complex, such as moving graphics interface element on the screen.

(3) EXAMPLES

Below, examples of the user interface and/or data input techniques that may be employed in the mobile apparatus according to an aspect of the present invention are described. In the following examples, it is assumed that the mobile apparatus includes an audio display and a tactile display in addition to the configuration as shown in FIG. 2. For the purpose of generality, the 1D analogue sensor is not limited to any specific type in the following example, instead it is assumed that the user can control 2D positioning and 1D analogue input while observing the output on the visual screen of the display 106. Although the type of the 1D analogue sensor is not assumed, the 1D sensor detects an amount and direction of user's bending input applied on the mobile apparatus.

(3.1) Integrated Selection and Data Browsing Interaction Method:

According to this example, there is provided an interaction method that integrates 2D or 1D browsing and selection of content, e.g. text or images into one single task. In the interaction method, the user only scrolls content on the screen of the display 106 using the 2D position sensor 105 (e.g. using a touch screen on the back of the apparatus) in one or two dimensions. Selectable interface elements are automatically selected depending on their current positions on the screen, the relation between position on the screen and which element is selected is defined by matching algorithm. The matching algorithm will be explained below in detail. Therefore, in order to select the selectable interface elements on the screen, the user simply scrolls the content so that the desired elements were selected.

FIG. 5 shows a flow chart and snapshots illustrating a process of the instant example for selecting the interface elements by the content browsing. Basic steps of the process are shown in the right side of FIG. 5 and the snapshots of the screen of an application and data received are shown in the left side of FIG. 5:

Step 51: The user is browsing a subway map on the screen of the display 106, and a currently selected item is item 201;

Step 52: Using the 2D position sensor 105, the user scrolls the map to the left by X and Y units;

Step 53: The actual amount of scrolling to the left depends on the application and the 2D position sensor 105, and is usually modified using some mapping functions (for example, the sensitivity might be adjusted). Accordingly, an actual scrolling amounts are calculated by F(X) and G(Y), which are the mappings between the data received from input device (2D position sensor 105) and the amount of actual scrolling of the content. Then, the map is scrolled by this content;

Step 54: The processor unit 108*a* then searches for the most appropriate selectable interface elements for the content position on the screen using the matching algorithm;

Step 55: If the selectable interface element is found, then the process proceeds to Step 56. If not, then proceed to Step 58;

Step 56: A newly-found selectable element, which is indicated as 202, is selected;

Step 57: Visual feedback for previous element 201 is removed and new selected element 202 is indicated as active element using various visual and tactile feedback;

Step 58: If the currently selected element is still visible, the process proceeds back to Step 51, and if not the process proceeds to Step 59; and Step 59: Remove all indications of the currently selected element and reset visual interface into null configuration.

The matching algorithm defines which selectable or actionable item should be selected out of several visible items depending on their current content position on the screen. A large variety of different algorithms may be used, for example:

a) The item that is closest to the center of the screen is selected. In order to select an item under this matching algorithm, the user scrolls content so that the desired item reaches to the middle of the screen.

b) The item that is in the direction opposite to the user direction of scrolling is selected. In order to select an item under this matching algorithm, the user scrolls the content in the direction opposite to the scrolling, e.g. pulling the item to be selected.

c) The item to be selected is identified by combination of the matching algorithms described in the above a) and b), or any other matching algorithm that can identified single item to be selected in accordance with the user inputs.

(3.2) Analogue Selection Input Techniques:

In conventional technology, a pressing operation of button is performed on a physical input device such as mouse or keyboard to confirm selection of a user interface element. Such button press operation is a discreet event. In this example, several techniques for conforming selection of data and interacting with data on a mobile apparatus are described. The mobile apparatus may be a hand-held device including an analogue sensor attached to the hand-held device, without using any buttons.

Although these techniques mostly for the mobile apparatus described above, these techniques may be applied to other devices that have similar properties, e.g. that can simultaneously control both 2D position and 1D force input.

Figure 6:
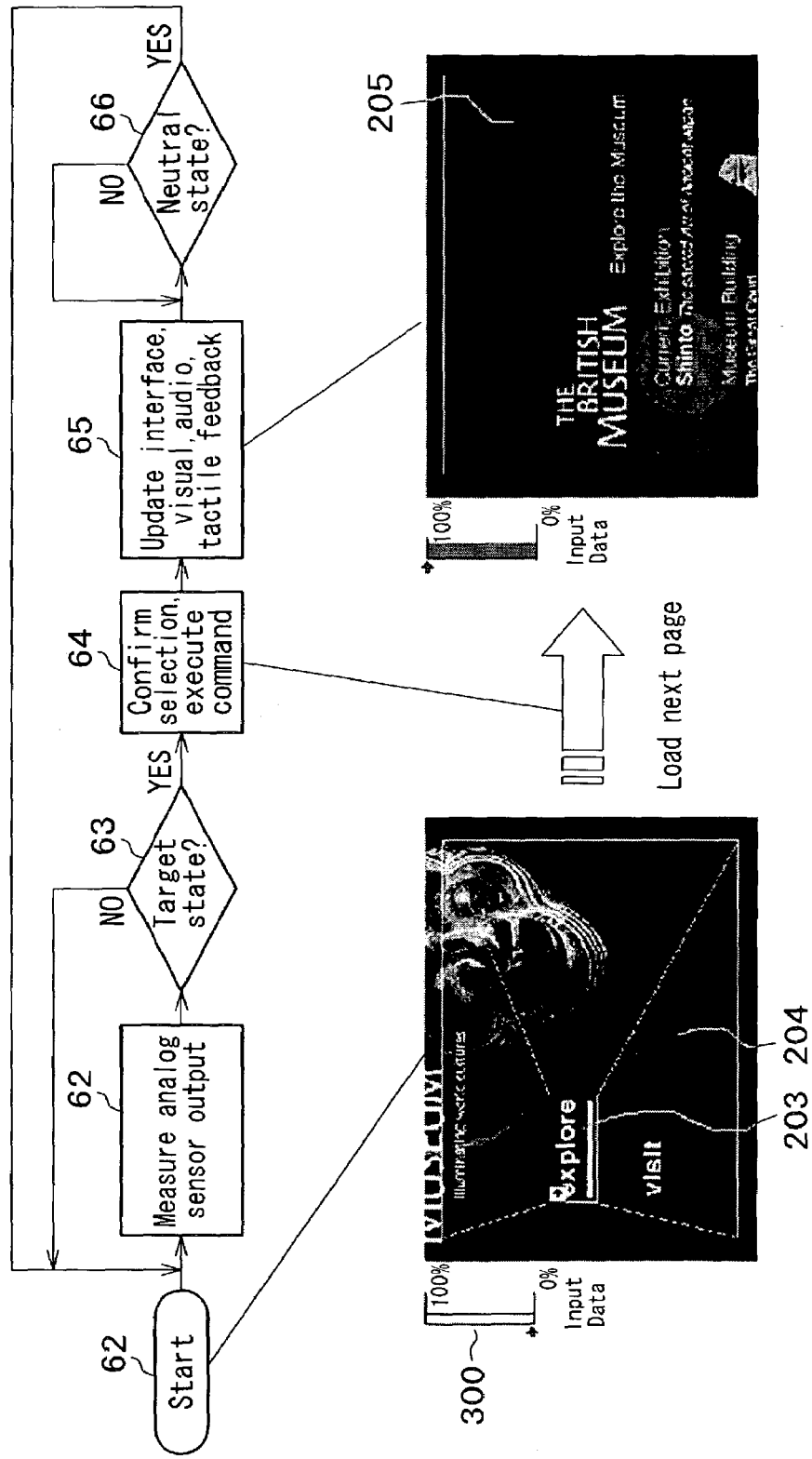
FIG. 6 is a view including a flow chart of algorithm for selecting link using the 1D analogue sensor, and snapshots of a visual screen at steps of the algorithm for an example application of a web browser.

(3.2.1) Simple Confirmation:

FIG. 6 presents a case of simple selection using the technique of the instant example for web page navigation, including flow chart and snapshots of visual state of the interface. A bar 301 on the left side of the snapshot indicate an output value of the 1D analogue sensor, e.g. amount of user's bending input:

Step 61: The techniques of the instant example starts when an actionable item of the interface (e.g. item 203) on the current interface view 204 of the screen is selected and the 1D analogue sensor 102 is in its 'neutral' state;

Step 62: The current value of the analogue controller, e.g. the amount of bending, is measured;

Step 63: The processor unit 108*a* determines if the analogue controller reached a target state (e.g. target up or target down) as shown in FIG. 4. If the target state is reached, the process proceeds to Step 64. If not, then the process proceeds back to Step 62 to repeat measuring of the output from the 1D analogue sensor 102;

Step 64: Selection is confirmed and appropriate actions are executed, such as loading next view 205. In the instant example, loading of the next web page is executed;

Step 65: The visual interface is updated for the next web page, tactile, visual and sound feedbacks are provided to support this action;

Step 66: Wait for the interface to return to the neutral state, and then continue from Step 61.

(3.2.2) Two Directional Confirmation of Selection:

Two directional confirmation works similarly to simple confirmation described in section (3.2.1) except that the "target up" and "target down" state are differentiated and these are used for different purposes. For example, the "target down" event may be used to confirm the selection, while the "target up" may be used to go back to the previous position.

(3.2.3) Integrated Preview and Selection Activation:

The "transition up" and "transition down" states may be used to make a smooth transition between user interface views. In current interfaces, when the next interface element is selected, the transition is instantaneous, however, by using the value of analog controller from the 1D analogue sensor 102 between the neutral and "target up" states or the neutral and "target down" states, it is possible to design smooth visual transition between the different user interface views. This technique is referred to as "analogue link" in the present specification.

Figure 7:
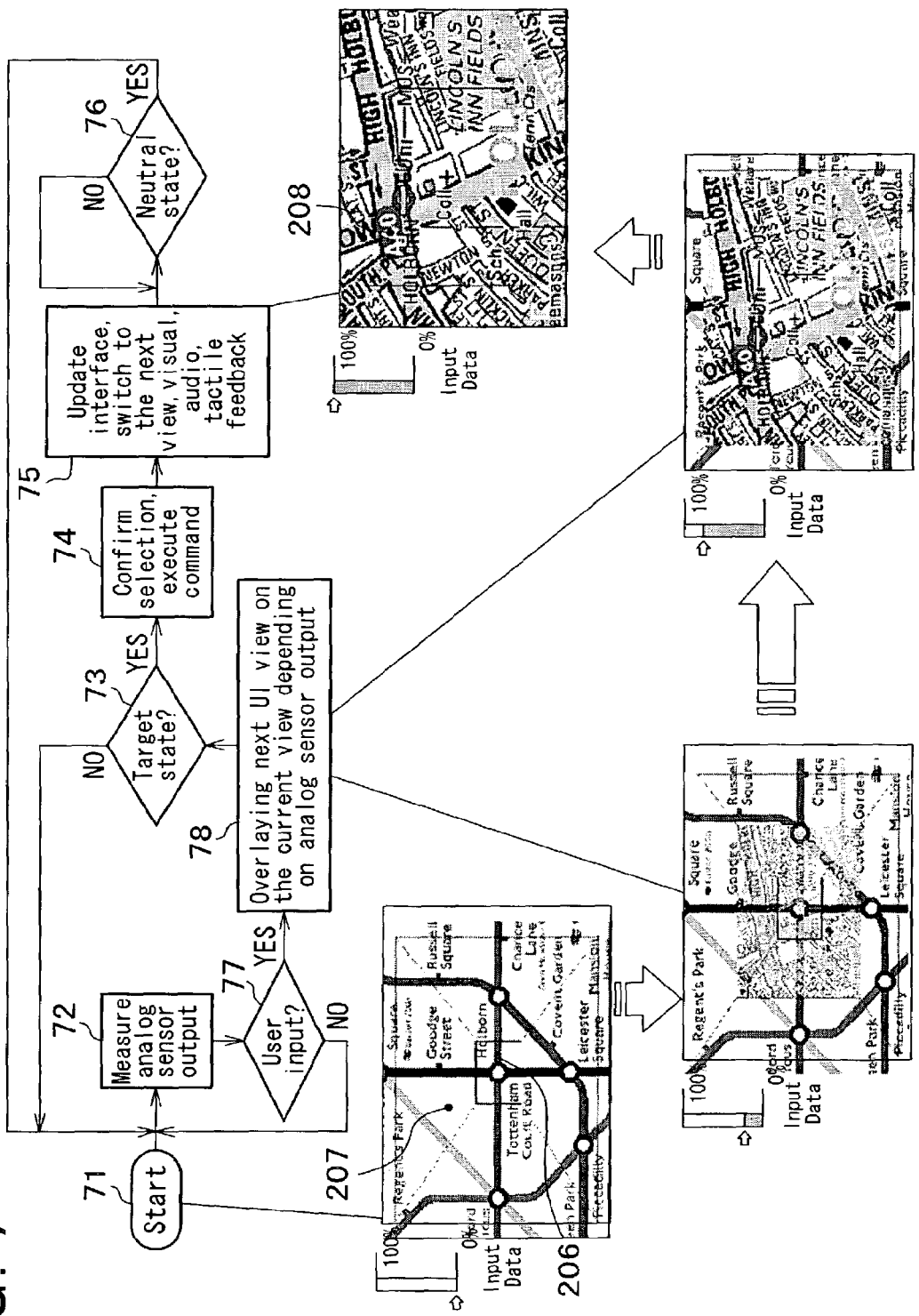
FIG. 7 is a view including a flow chart of algorithm for analogue links in which smooth transition between the user interface views using analogue controller is performed, and snapshots of a visual screen at steps of the algorithm.

FIG. 7 presents a case of selection using the present techniques for map navigation (similar to FIG. 5), including flow chart and visual state of the interface. FIG. 7 presents how two views can be overlapped. An initial view (current interface view 207) is the subway map, while the other view (next interface view 208) is a corresponding street map:

Step 71: The techniques starts when an actionable item of the interface (e.g. item 206) is selected on the current interface view 207 with the 1D analogue sensor 102 in its 'neutral' state;

Step 72: The current output value of the analogue controller, e.g. the amount of bending, is measured;

Step 77: If there is no input, the process proceeds back to Step 72. If there is input, then the process proceeds to Step 78;

Step 78: The next interface view 208 is overlaid on top of the current interface view 207. The greater the value of analogue controller, the more visible the next interface view of the user interface is. Any one or combination of the following methods may be used to overlay views:

(a) Transparency: the next view is overlaid on top of the current view, and the transparency of the next view is controlled by the value of analogue controller. The more the user applies input to analogue controller, the less transparent the next view becomes;

(b) Zoom: size of the next view is controlled by the value of the analogue controller. The more the user applies input to analogue controller, the larger the next view becomes;

(c) Combination of the zoom and transparency;

(d) Any other method that allows total or partial superimposing of the two views while allowing the user to see both at the same time.

Step 73: Check if the analogue controller reaches target state (e.g. target up or target down)? If yes, proceed to Step 74. If not, go back to Step 72;

Step 74: Selection is confirmed and appropriate actions are executed, e.g. the next user interface view 208 completely loaded and the previous view is not visible;

Step 75: The visual interface is updated, and tactile, visual and sound feedbacks are provided;

Step 76: Wait for the analogue controller to return to the neutral state, and then continue from Step 71.

(3.3) Techniques for Interactive Previewing of Additional Information:

The "transition up" and "transition down" states may be used to provide the user with information related to the actionable item. Examples of attached information can be preview of the content in the link, attached help information, notes attached by the user and etc. As the user applies input on the sensor, the "transition up" or "transition down" state provides the user with related information on the link. The properties of the additional information can be controlled by the analogue link, which may include:

a) transparency;

b) size;

c) information level of details, e.g. as the user applies more input on the analogue controller, the more information is presented; and d) combination of the above or any other applicable properties.

Figure 8:
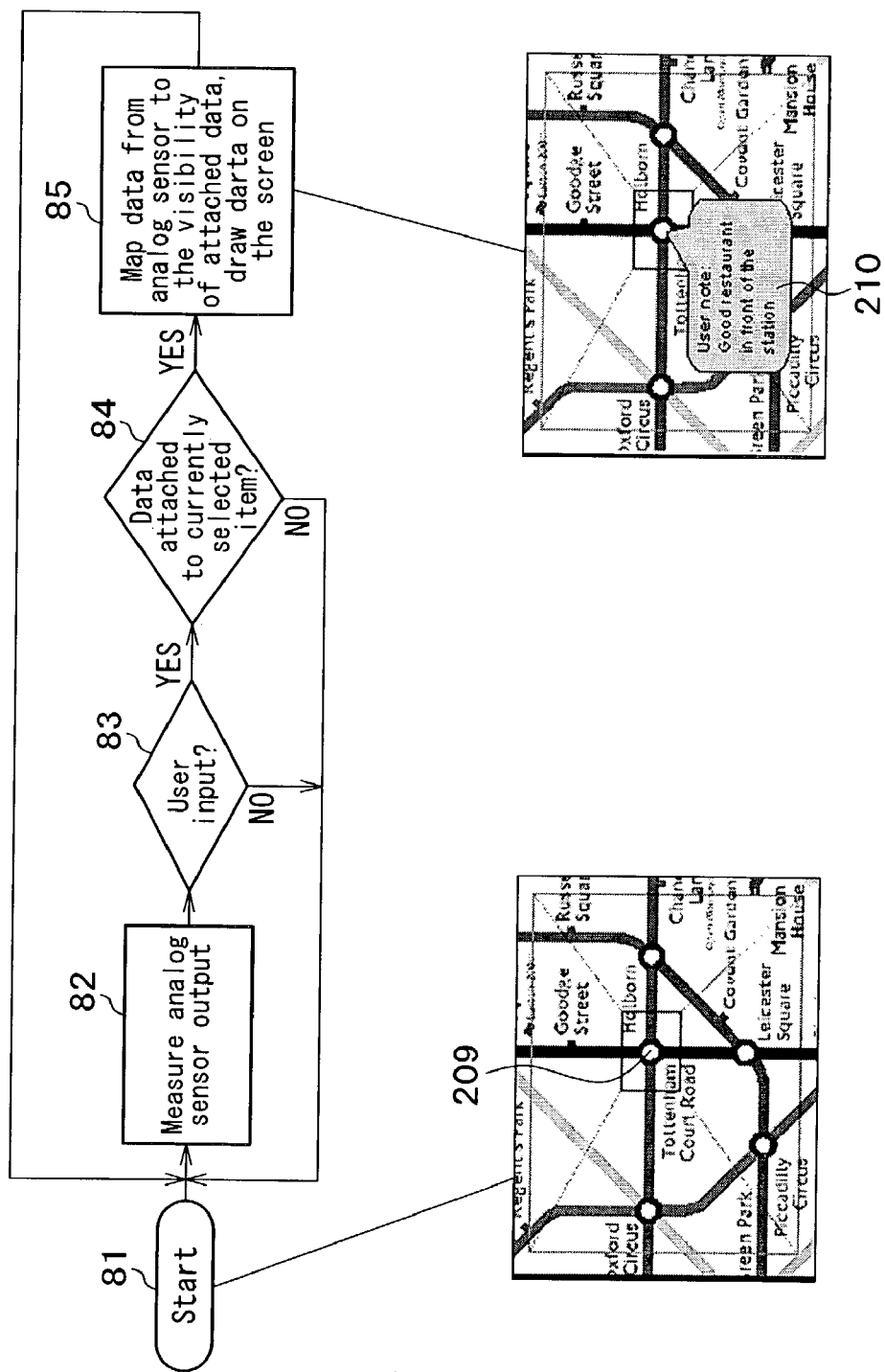
FIG. 8 is a view including a flow chart of algorithm for previewing attached data to the actionable items, and snapshots of a visual screen at steps of the algorithm.

FIG. 8 presents a flowchart of process according to the instant example and snapshots associated with the process for a case of previewing a note data attached to an actionable item using the technique of the instant example:

Step 81: The process starts when an actionable item of the interface (e.g. item 209) is selected on the current interface view displayed on the screen with the 1D analogue sensor in its 'neutral' state;

Step 82: The current output value of the analogue controller, e.g. the amount of bending, is measured;

Step 83: If there is no input, the process proceeds back to Step 82. If there is input, proceed to Step 84;

Step 84: If there is some viewable data is attached, the process proceeds to Step 85. If there is no data, proceed back to Step 82.

Step 85: Attached data 210 is overlaid on top of the current view. The greater the output value of analogue controller, the more visible this attached data becomes. Controlled parameters of the visibility may include:

a) transparency: the data is overlaid on top of the current pages and its transparency is controlled by the output value of analogue controller. The more the user applies input to the 1D analogue sensor, the less the transparent of the additional data becomes.

b) zoom: the size is of additional information attached to the apparatus controlled by the output value of the analogue controller. The more the user applies input to the 1D analogue sensor, the larger the size of the additional data becomes;

c) combination of the zoom and transparency;

d) any other method that allows to superimpose the two views for the user while allowing the user to see both at the same time.

(3.4) Interaction Techniques for Zooming and Viewpoint Control:

In this example, a GUI interaction method allowing the zooming in and out of visual information presented on the screen with simultaneous change of viewpoint position. The image is zoomed in with the 'transition up' state and zoomed out with the 'transition down' state. The output value of the analogue controller is mapped to the speed or amount of zooming. Because the position control can be accomplished by the use of the 2D position sensor, independently from the analogue input via the 1D analogue sensor, the user can zoom and control position of the viewpoint at the same time, with the same single gesture.

Figure 9:
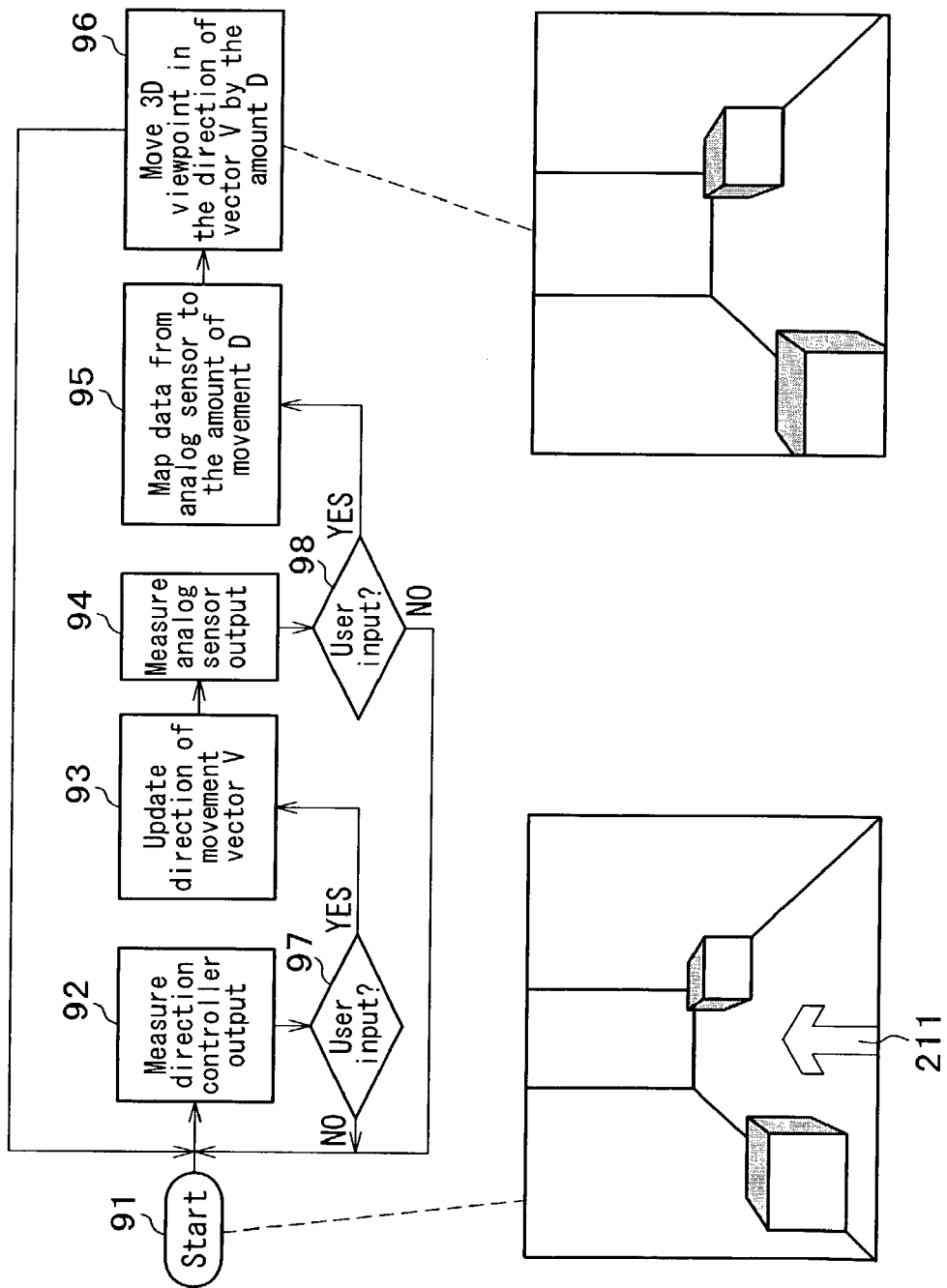
FIG. 9 is a view including a flow chart of algorithm for performing 3D navigation operation, and snapshots of a visual screen at steps of the algorithm.

(3.5) Three-Dimensional Navigation Techniques:

The technique described in the above example (3.4) may be used for a 3D navigation in the scene—zooming in will result in flying inside, while directional control can control direction of flight. FIG. 9 presents a flow chart of process according to the instant example and associated snapshots of the process for the interface techniques for the 3D navigation using the mobile apparatus according to the present embodiment:

Step 91: The process starts when the 1D analogue sensor 102 is in the neutral state and 3D environment is presented on the screen of the display 106;

Step 92: The current output value of the 2D position sensor 105 is measured;

Step 97: If there is no input, the process proceeds to Step 92. If there is input, proceed to Step 93;

Step 93: Using two-dimensional coordinate data outputted from the 2D position sensor, 3D direction of a vector V that defines direction of movement 211 is updated. The vector may be presented to the user to provide visual feedback to the user or hidden;

Step 94: The current output value of the analogue controller is measured;

Step 98: If there is no input, the process proceeds to Step 92. If there is input, proceed to Step 95;

Step 95: Using measured value of the analogue controller, an amount of translation D along the vector V is calculated. Various mappings may be defined, such as linear mapping, non-linear mappings and any other;

Step 96: Translate the viewpoint in direction of vector V by the amount D and continue from Step 92.

Variations of this 3D navigation algorithm may be implemented in different types of applications, depending on the viewpoint position and controller parameters. In the above-described examples, the 2D position sensor 105 is used to provide the 2D position input. Alternatively, the 2D position sensor 105 may be replaced with any other type of devices that can control the scrolling according to user's input if the 2D position input is used for scrolling the screen view in either 1D or 2D directions. For example, a tilt sensor including accelerometers may be used to detect a tilt of the apparatus so that the user may control the speed and direction of scrolling by tilting the apparatus to a certain direction and amount.

(3.6) Tactile Feedback:

The examples described above may be extended with a tactile feedback apparatus to communicate to the user the current state of the apparatus. For example, the tactile feedback may be realized by utilizing piezo-actuators in a multiple layer configuration.

According to the present embodiment, the user can interact with a mobile apparatus or small handheld device without the use of mouse, touch panels and/or keyboard. In case that the touch panel is located on the back of a display screen of the apparatus, the user interaction with the apparatus does not occlude screen, which makes it easier to interact with. The interaction becomes simpler, more effective, more intuitive and enjoyable.

Furthermore, according to the present embodiment, the interaction technique with the GUI elements enables to provide the simple and basic method of designing interfaces that can be used with a flexible computer and many new interaction devices. The technique allows to covering most of the basic interaction tasks with hand-held computers.

Advantages of the technique according to the present embodiment are that, the technique is a single unified way performing many interaction tasks through simple physical manipulation of the apparatus. This makes interface simpler and more intuitive to use. The user should remember only how to use several simple operations, and this is all that is needed to do the tasks.

In the present embodiment, no additional graphical user interface element is needed on the screen for performing the tasks or interacting with application program. Accordingly, it saves space on the screen and promotes efficient usage of the display area. Such feature is particularly important for handheld devices having relatively small display area.

The techniques according to the present embodiment enables to automate many tasks, and makes it easy to use the apparatus in mobile setting compared to the conventional techniques in which the precise interaction pointing with the mouse or pen or other pointing devices is difficult on small handheld devices.

The techniques according to the present embodiment are more natural and easy to use, and do not require additional input devices such as pen. Accordingly, the techniques naturally fit the devices where the touch panel is located behind the display.

SECOND EMBODIMENT (1) System Configuration and Components

The second embodiment of the present invention is described in detail below. The second embodiment relates to techniques for text input and/or multi-dimensional menu systems in the context of a generic GUI for the type of an apparatus described in the first embodiment as shown in FIGS. 2 and 3. In the following explanation of the present embodiment, only parts of the system configuration different from the first embodiment are described. The same definitions and terms will be used for interpretation of the 1D analog input data as shown in FIG. 4 of the first embodiment. One of important properties needed for the 1D analogue sensor 102 is that it returns to the neutral state by itself when there is no input from the user is applied.

The present embodiment is applicable for text input in various apparatuses such as sentence input apparatuses disclosed Japanese Patent Application (laid open) H10-154033 and H10-154144. Specifically, the text input techniques according to the present embodiment may be useful for selecting one of items from a group of candidate items displayed on a display screen.

Figures 10A, 10B, 10C:
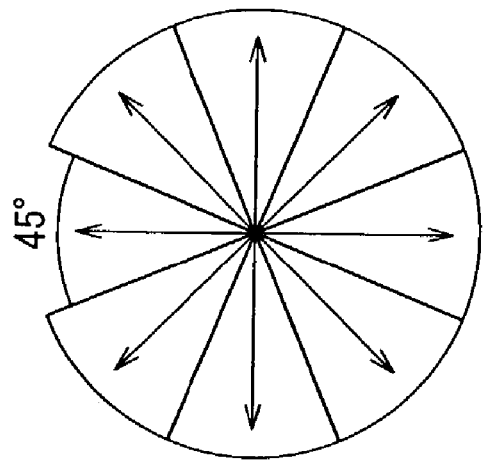
FIG. 10(A) is a view illustrating an example item grid to be used with directional input detected by the 2D position sensor for selection.
FIG. 10(B) is a view illustrating an example directional segments to be used for detecting the directional input.
FIG. 10(C) is a view illustrating relationship between the directional segments and the item grid shown in FIGS. 10(A) and 10(B)

In the present embodiment, data from the 2D position sensor 105 is interpreted in the following manner. FIGS. 10(A)-(C) illustrate an example on how the 2D position data can be used to measure DIRECTION rather than position (like with a cursor). FIG. 10(A) illustrates an example of item grid for selection, FIG. 10(B) illustrates an example of direction segments, and FIG. 10(C) illustrates an example of relationship between the direction segments and the items. This approach is taken in the example implementations whenever a selection is made from a grid. The advantage of this approach is that actions become repeatable.

For a 3×3 grid of items shown in FIG. 10(A), the center item (number 5 in the figure) is selected by default. If this is the desired item, the user only needs to confirm this default selection. If one of the items around the center is desired, a selection may be made by DIRECTIONAL MOVEMENT using the 2D position sensor 105 described above. The directional movement is then measured in relation to an array of angle segments (of 45° in the example given below). For example, a down-left movement would select the bottom left item (number 7 in the example), independent of the position of the user's finger on the 2D position sensor. An up-right movement would select the number 3 in the example, a right movement would relate to number 6 etc.

(2) Details of the Interface Techniques (2.1) Interaction Flow:

The GUI control techniques according to the present embodiment work in combination with the input device (1D analogue sensor and 2D position sensor) described above. Three variations of the GUI control techniques are described below. Text input will be used as an example. However, the present invention is not limited to these variations, and the present embodiment may similarly be applicable to other variations where the items consist of menu items instead of text characters.

Figure 11:
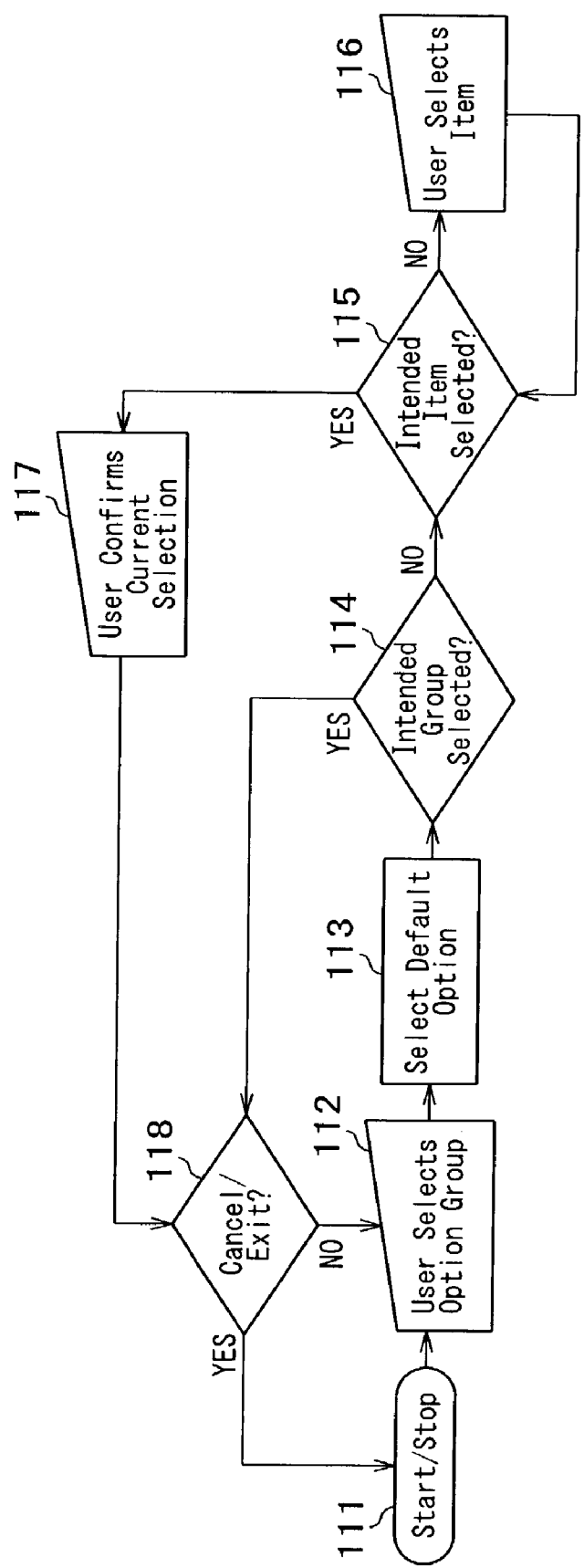
FIG. 11 is a flow chart for a basic interaction flow in the second embodiment of the present invention.
Figure 12:
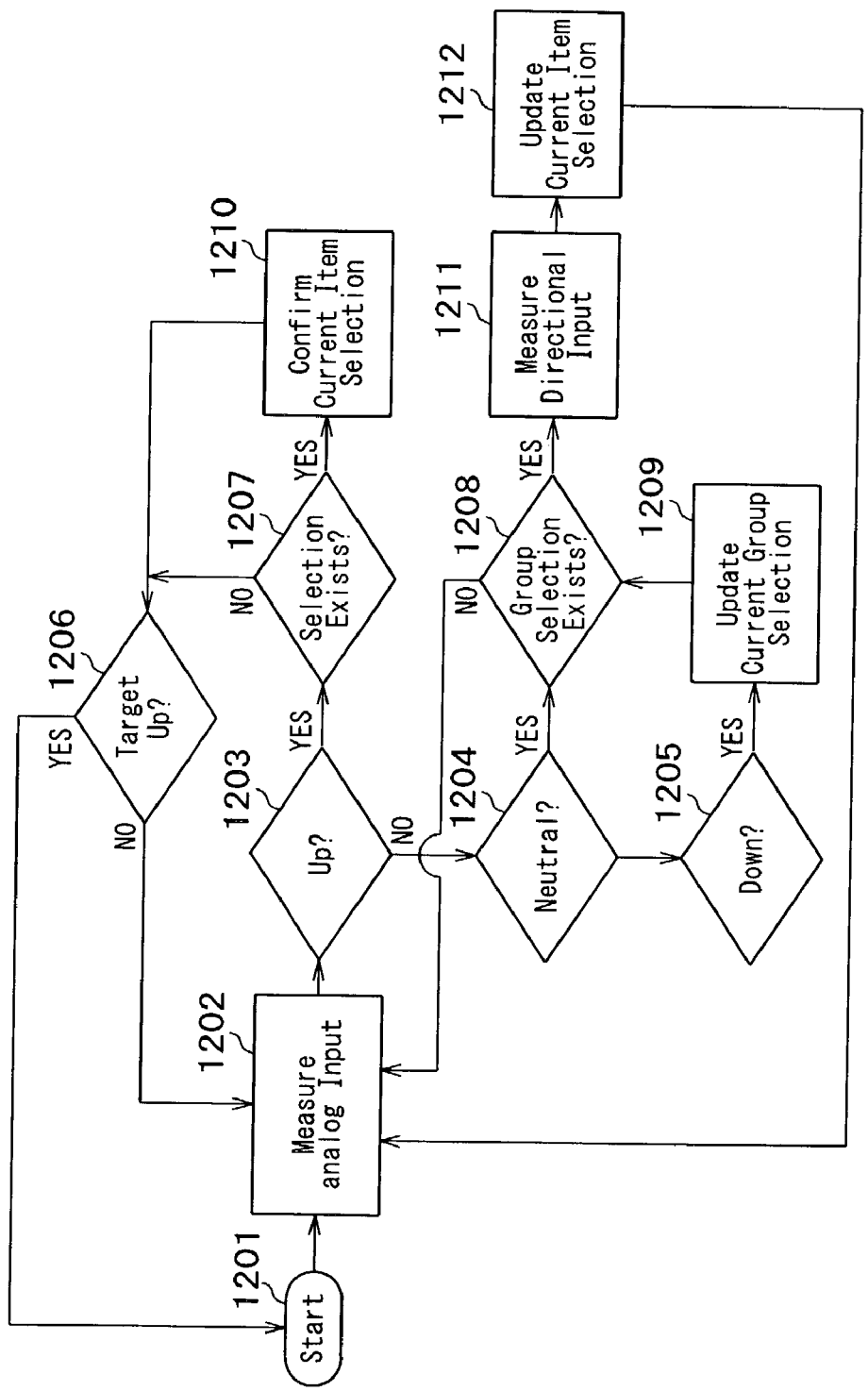
FIG. 12 is a flow chart for an example implementation with cycling group according to the second embodiment.

The basic flow of interaction is illustrated in FIG. 11. All variations of the GUI control techniques share the following interaction steps, where step groups a) and b) may take place simultaneously:

a) Selection of a GROUP of items in the multi-dimensional array (Steps 112-114).

b) Selection of an ITEM within the selected group (Steps 115-116).

c) CONFIRMATION or cancellation of the current group/item selection (Step 117/Step 118).

The interaction steps shown in FIG. 11 may be compared to the use of a telephone keypad, where the user first selects a button representing a group of characters (i.e. '2' for access to 'A', 'B', 'C', etc.) and then presses that button repeatedly to reach the intended item (i.e. character). The GUI control techniques differ from this method of text input in that the 1D analog input in combination with 2D position sensing is used in the place of buttons. The example implementations differ in how the user selects a group of items. All examples rely on the combined use of the 1D analog input and the 2D position input.

Figure 13A:
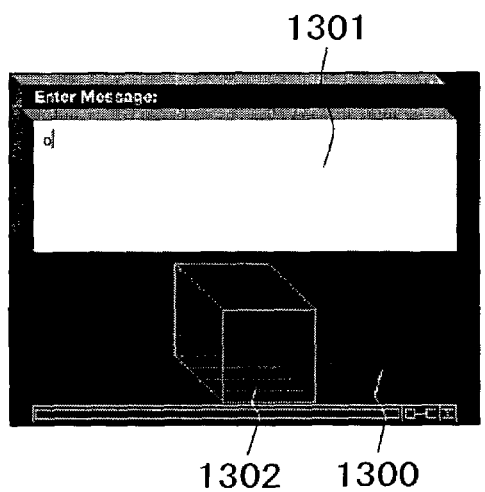
FIG. 13(A) is a view showing a snapshot of a visual screen at a start state of the example flow of FIG. 12.

(2.2) Example Implementation Using Cycling Layers:

FIGS. 12 and 13(A)-(D) illustrate a flow chart of process according to this example and snapshots displayed on a visual screen of the display 106 in association with the process. Each of the snapshots shows a screen view 1300 in which a window 1301 for showing text entered and a stack of layers 1302 are presented. This example uses a visual system of layers, each of which represents a group of items. The currently selected layer 1302b is on the 'top' of the stack. The users cycles through these layers by manipulating the 1D analog sensor 102, which serves as the 1D analogue input device. FIG. 13(A) is the snapshot of a start state in Step 1201.

Figure 13B:
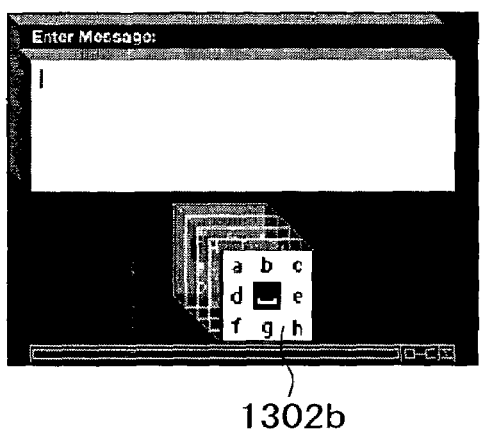
FIG. 13(B) is a view showing another snapshot of a visual screen during group selection in the example flow of FIG. 12.

Group Selection (Steps 1202-1209):

FIG. 13(B) is the snapshot during the group selection. The 1D analog input is measured at Step 1202, and measured input is checked if the analogue input is in 'up' or 'down' direction or 'neutral' state in Steps 1203-1205. If the 1D analogue input is in the 'down' state, the process proceeds to Step 1209 and update current group selection. If the 'up' or 'neutral' state, proceed to Step 1207 or Step 1208, respectively. The analog input 'transition down' data is mapped to the speed at which the application cycles through the layers. As the input data nears the 'target down' state, the speed of layer cycling increases. Cycling stops if the input device is in the 'neutral' state.

Figure 13C:
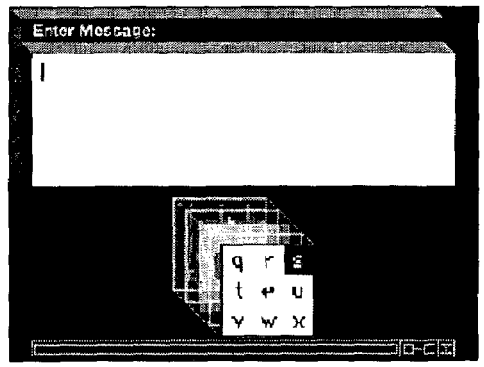
FIG. 13(C) is a view showing another snapshot of a visual screen during item selection in the example flow of FIG. 12.

Item Selection (Step 1211):

FIG. 13(C) is the snapshot during the item selection. In the example, the items are arranged on a 3×3 grid, as shown in FIG. 13(B). Each time a new group is selected, the item in its center is selected by default. Other items are selected using directional input with the 2D position sensor (Step 1211) and updated current item selection is presented (Step 1212).

Figure 13D:
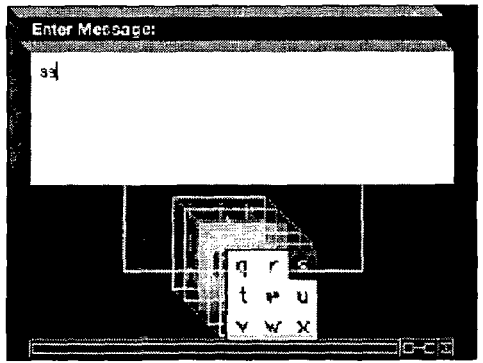
FIG. 13(D) is a view showing another snapshot of a visual screen during item confirmation in the example flow of FIG. 12.
Figure 14:
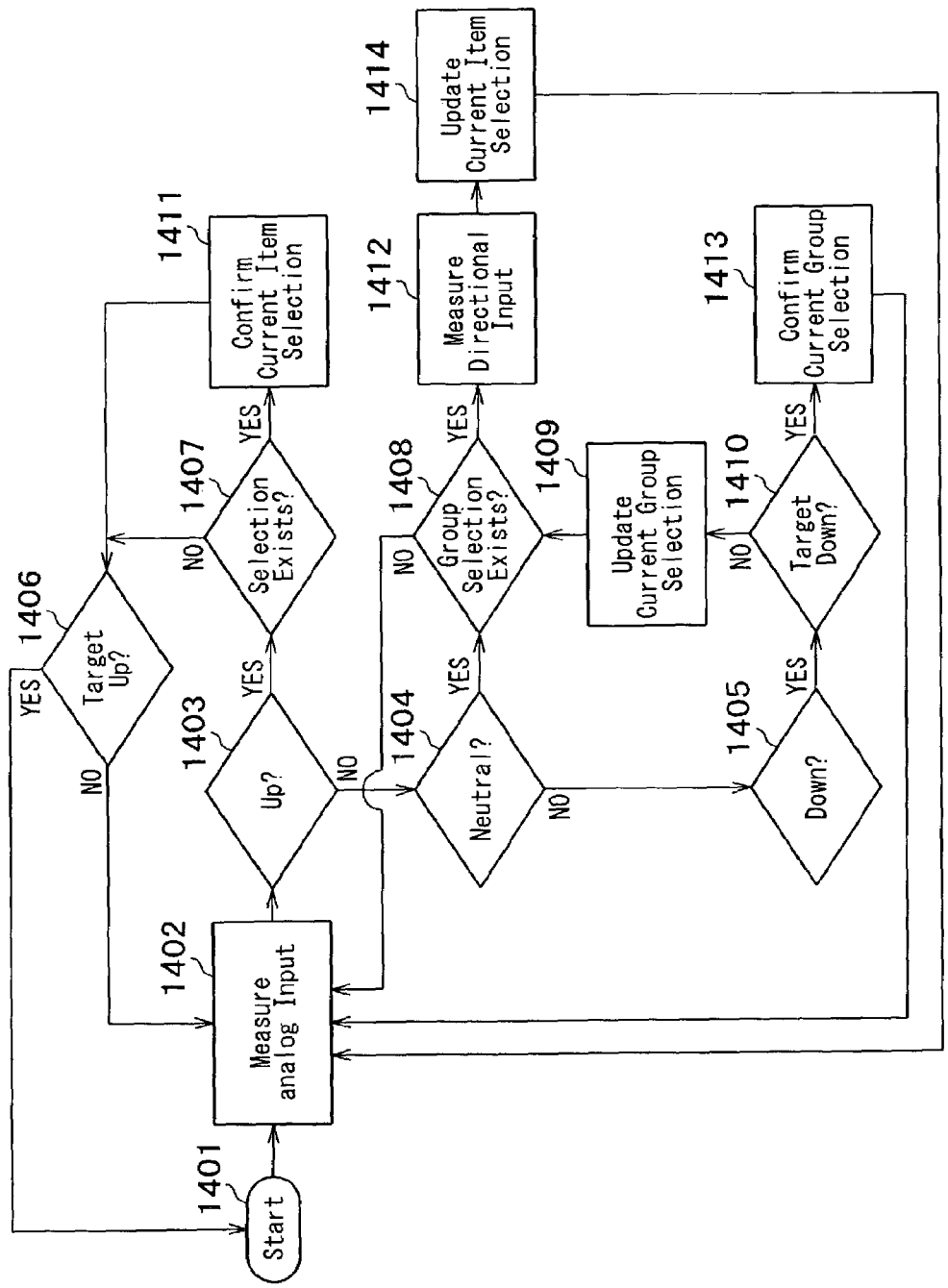
FIG. 14 is a flow chart for an example implementation with ratchet layers according to the second embodiment.

Selection Confirmation or Cancellation (Step 1210):

FIG. 13(D) is the snapshot during the selection confirmation. Once the desired group and item are selected (Yes in Step 1207), the user confirms the selection with 'transition up' (Step 1210). If no selection should be made, the 'Done' layer has to be selected to exit selection mode.

(2.3) Example Implementation Using 'Ratchet' Layers:

FIGS. 14 and 15(A)-(F) illustrate a flow chart of process according to this example and snapshots displayed on a visual screen of the display 106 in association with the process. As in the previous example of FIGS. 12 and 13(A)-(D), this example also uses a visual system of layers, each of which represents a group of items. The currently selected layer is on the 'top' of the stack. The user selects layers by manipulating the 1D analog input device. FIG. 15(A) is the snapshot in a start state (Step 1401).

Group Selection (Steps 1402-1409):

FIG. 15(B) is the snapshot during the group selection. The analog input 'transition down' data is mapped to the depth of layers on the stack. For example, for a stack of four layer groups and input data ranging from 0 ('neutral') to −5 ('target down'), the 'transition down' data may be mapped like below:

| | |
|---|---|
| 0 to −0.5 | no selection |
| −0.5 to −1.5 | groups 1 |
| −1.5 to −2.5 | group 2 |
| −2.5 to −3.5 | group 3 |
| −3.5 to −4.5 | group 4 |

−4.5 to −5 Cancel Group Selection (Step 1413):

As the 1D analogue input device returns to the 'neutral' position, the 'deepest' group stays selected until the group selection has been cancelled with 'target down' (Step 1413) or the current selection confirmed (Step 1411). FIG. 15(C) is the snapshot in Step 1408 where the default selection is performed with the 'neutral' state.

Item Selection (Steps 1412-1414):

FIGS. 15(D) and 15(E) are the snapshots during the item selection. Items are arranged on a 3×3 grid, as shown in the figures. Each time a new group is selected, the item in its center is selected by default. Other items are selected using directional input with the 2D position sensor 105, as described above. The group selection and the item selection may be performed simultaneously.

Selection Confirmation or Cancellation (Steps 1406, 1411, 1413):

FIG. 15(F) is the snapshot during the selection confirmation. Once the desired group and item are selected, the user confirms the selection with the 'transition up' state. The group selection may be cancelled with the 'target down' state, and the selection mode may be exited with the 'target up' state.

Figure 17A:
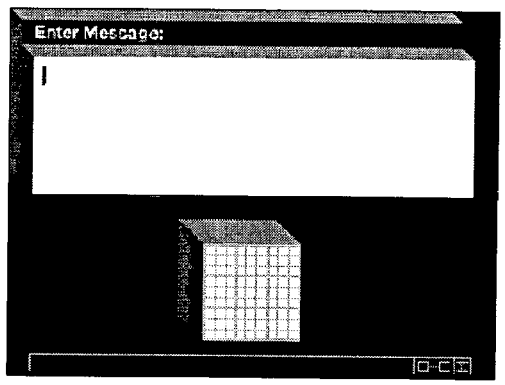
FIG. 17(A) is a view showing a snapshot of a visual screen at a neutral state of the example flow of FIG. 16.
Figure 17B:
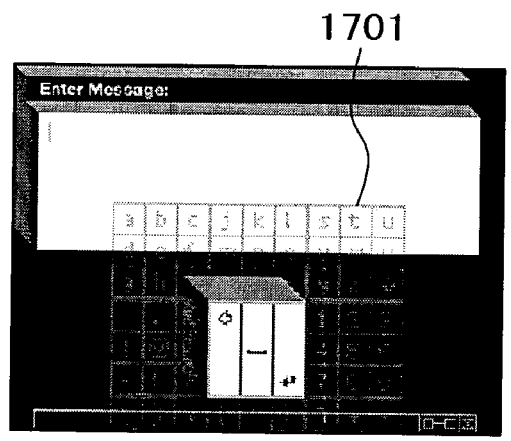
FIG. 17(B) is a view showing another snapshot of a visual screen during group selection (default selection) in the example flow of FIG. 16.

(2.4) Example Implementation Using Nested Grids:

FIGS. 16 and 17(A)-(F) illustrate a flow chart of process according to this example and snapshots displayed on a visual screen of the display 106 in association with the process. In the previous examples, the 1D analog input data is used as a direct means of group selection. In this example, the 1D analog input data is used as a mode switch between group selection and item selection while the directional input using the 2D position sensor is used for both group selection and item selection. Visually, this system is presented as a 3×3 grid of groups, with each grid containing up to 9 (3×3) items as shown in FIG. 17(B). FIG. 17(A) shows a neutral state from which the process starts (Step 1601).

Figure 17C:
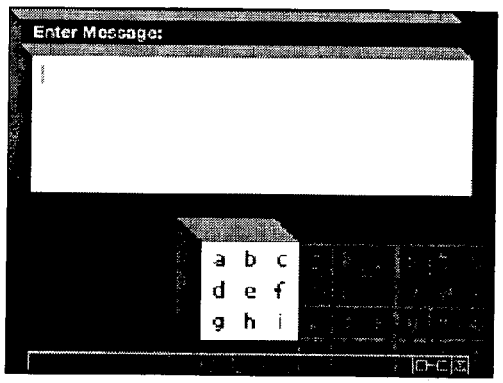
FIG. 17(C) is a view showing another snapshot of a visual screen during group selection in the example flow of FIG. 16.

Group Selection (Steps 1602-1613):

FIGS. 17(B) and 17(C) are the snapshots during the group selection. The 'transition down' state of the 1D analogue input detected by the 1D analogue input device 102 triggers this group selection mode in which one of the group can be selected from nested grids 1701. The center group is selected by default. While the 1D analogue input device 102 is in the 'transition down' state (Step 1605), the directional input detected by the 2D position sensor 105 is used to select a group (Steps 1610, 1609, 1613). The group selection may be cancelled with the 'target down' state (Step 1614).

Figure 17D:
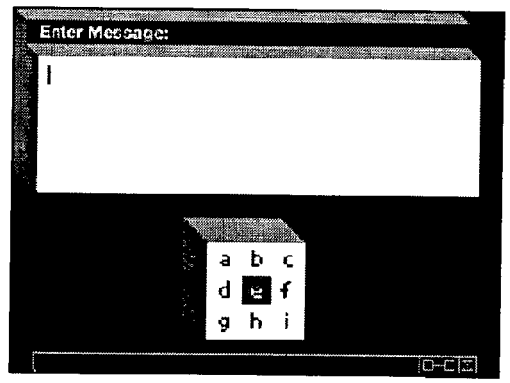
FIG. 17(D) is a view showing another snapshot of a visual screen during item selection (default selection) in the example flow of FIG. 16.
Figure 17E:
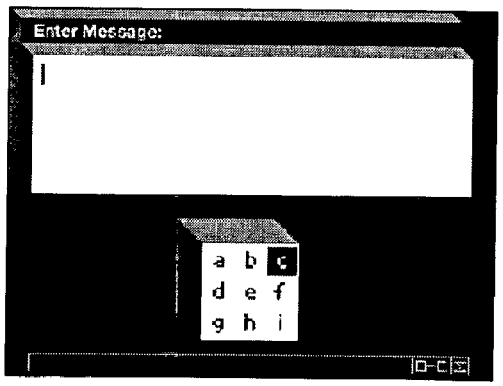
FIG. 17(E) is a view showing another snapshot of a visual screen during item selection in the example flow of FIG. 16.

Item Selection (Steps 1612, 1615):

FIGS. 17(D) and 17(E) are the snapshots during the item selection. While the 1D analog input device is in 'neutral' position, directional input is used to select an item (Steps

1612, 1615). The center item is selected by default. The item selection may be performed using the same algorithm as in the previous examples.

Figure 17F:
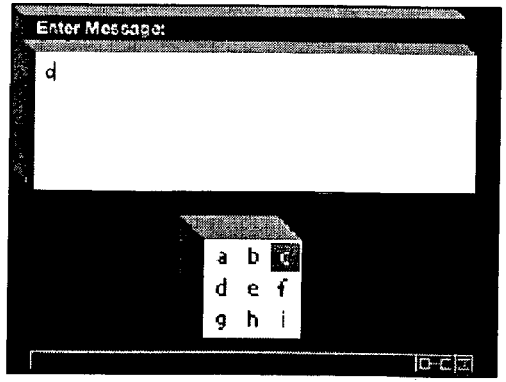
FIG. 17(F) is a view showing another snapshot of a visual screen during item confirmation in the example flow of FIG. 16.

Selection Confirmation and Cancellation (Steps 1606, 1611, 1614):

FIG. 17(F) is the snapshot during the selection confirmation and cancellation. If a group and an item are selected, this selection is confirmed with the 'transition up' state of the 1D analogue input (Step 1611). Any selection is cancelled with the 'target down' state (Step 1614), and the selection mode is exited with the 'target up' state (Step 1606).

In the examples of present embodiment described above, the 2D position sensor 105 is used to enter the directional input to select one of items in the selected group or one of groups from a set of groups. However, the present invention is not limited only to these examples, and any other type of device may be used instead of the 2D position sensor 105 if such device can detect the user input for selecting one of items of the selected group displayed on the screen. For example, a tilt sensor and its visual feedback may be utilized to determine the directional input, i.e. user's input regarding the direction in relation to the center position of the visual screen for the item selection.

The GUI methods according to the present embodiment described above allow the user to interact with small handheld apparatuses without use of mouse, touch panels and/or keyboard. Because the 2D position sensor is located on the back of the apparatus, the user interaction with the apparatus does not occlude the visual screen, thereby making it easier to maintain the maximum visibility of the screen all the time during operation of the apparatus.

The GUI methods described above are part of a wider GUI environment that is based on the combination of 1D analog and 2D position sensing input devices. Within this wider environment, the GUI methods may be used to provide the following functionality:

a) Text Input:

The present embodiment enables text input without the use of buttons or stylus. According to the present embodiment, the GUI means is provided for the apparatus that uses the analogue input and the directional input so as to enter text or character more conveniently in the mobile setting.

b) Menu Systems:

The present embodiment enables to provide menu systems in an environment that does not use cursor-based point-and-click interaction. Where the present examples use text input to demonstrate the GUI methods according to the present embodiment, it is easy to imagine menu items instead of character options. These menus could work in much the same way as desktop GUI menus, i.e. they could contain items relating to system functions (such as 'Save', 'Close', etc.) as well as content related items (such as bookmarks, TV channels, etc.).

The first and second embodiments described above may be used for interacting with small handheld devices or apparatuses without use of mouse, touch screens disposed on a visual screed, or keyboard. Examples of such devices and apparatuses may include:

remote controls with display screens;
remote controls for TV sets;
PDAs and personal information browsers/mangers;
mobile phones;
electronic books;
handheld game devices;
personal navigation device with GPS
remote display unit of TV set Furthermore, the present invention may be applied to an apparatus for navigation of video images. For example, with an analog sensor in the 'neutral' state, video is played back at normal speed. Bending up and down may be incorporated to control the speed of video playback. Specifically, the control may be configured to slow the video playback and/or rewind operation when the analogue sensor is being bended up and to speeds up the video playback and/or rewind operation when the analogue sensor is being bended down. Alternatively, the control with the analogue output may include sound playback and/or rewind.

According to the embodiments described above, the data input and interface means are provided for an apparatus to allow the user to interact with the apparatus by physically manipulating a body of the apparatus, and to perform a range of tasks without using button, pen or any other mechanical controller.

Further, according to the embodiments described above, the data input and interaction means are provided for an apparatus that utilizes the positioning inputs and the analogue inputs so as to command the apparatus to perform various tasks, and to input text or make selection from a menu/list.

THIRD EMBODIMENT

Figure 18:
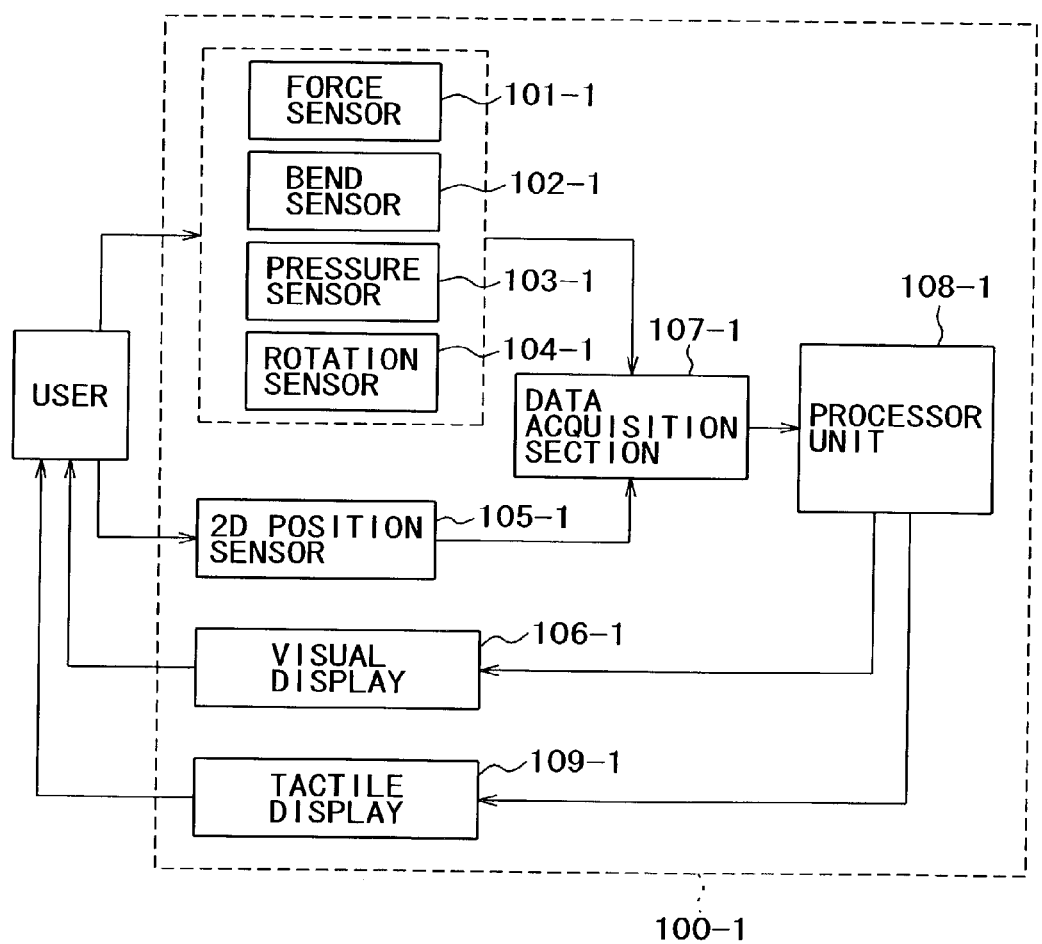
FIG. 18 is a schematic view showing a hardware configuration of a portable apparatus 100-1 according an embodiment of the present invention.

FIG. 18 shows a schematic diagram of hardware configuration of a portable apparatus 100-1 in accordance with the third embodiment of the present invention. The portable apparatus 100-1 includes a processor unit 108 that serves as a main controller, a force sensor 101-1, a bend sensor 102-1, a pressure sensor 103-1, a rotation sensor 104-1, a touch sensor for allowing a user to input a two-dimensional position, a visual display 106-1, a tactile display 109-1 and a data acquisition section 107-1. In the present embodiment, the sensors 101-1-105-1 serve as interfaces for the user input, and the displays 106-1, 109-1 serve as interfaces for the user output.

The processor unit 108-1 may be configured from a combination of, for example, a Central Processing Unit (CPU) that serves as a processing engine, a Random Access Memory (RAM) for loading execution programs and temporary storing work data, a Read Only Memory (ROM) for storing program codes and other data. The processor unit 108 performs applications utilizing physical interactions such as user's gestures under an execution environment provided by an Operation System (OS). The visual display 106-1 may include, for example, a Liquid Crystal Display (LCD), and visually presents processing results of the processor unit 108-1.

The touch sensor 105-1 may be, for example, placed on top of the visual display 106-1. Alternatively, the touch sensor 105-1 may be placed on one side of the main body of the apparatus 100-1 opposite to the visual display 106-1 (i.e., a back side of the apparatus 100-1). In the latter case, the user can input a two dimensional coordinate by scanning the back side of the apparatus 100-1 while simultaneously confirming visual contents displayed on the display screen placed in the front side thereof. With this configuration, the finger of the user indicating the two-dimensional coordinate would not block visibility of the display screen of the visual display 106-1.

The tactile display 109-1 is a device for providing a tactile feedback of processing results in the processor unit 108-1. The tactile display 109 may control a tactile pattern to be presented by applying different control signals. The processor unit 108-1 may map the processing result to the control signal that is a voltage signal and a function of time. For example, the tactile display 109-1 may be configured with multi-layered flexible piezo actuators. The multi-layered piezo actuator may include a upper layer piezo actuator and a lower piezo actuator. The multi-layer flexible piezo actuator may be bend as a whole, upward or downward by applying opposite voltages on the upper and lower layer piezo actuators, respectively, whereby contracting the upper layer/the lower layer while expanding the lower layer/the upper layer. Examples of the tactile display are disclosed in Japanese patent application JP 2002-18228, which is assigned to the same assignee as the present application.

The force sensor 101-1, the bend sensor 102-1, the pressure sensor 103-1, the rotation sensor 104-1 are devices for detecting physical interactions such as the user's gestures and capturing them as computer data. It should be noted that the portable apparatus 100-1 may not need to have all of these sensors 101-1-104-1, but preferably to have at least one of these.

The data acquisition section 107-1 digitalizes these sensor outputs and provides to the processor unit 108-1. In the processor unit 108-1, an interaction regarding to different orthogonal information may be realized with a single gesture by simultaneously and transparently processing a two-dimensional position input obtained by the touch sensor 105-1 and gesture inputs obtained by the data acquisition section 107-1. The processor unit 108-1 may provide, for example, an interaction such that a map of city is scrolled while changing a scale of the map at the same time. The interaction based on the gesture is direct and efficient as well as has its beauty.

Figure 19:
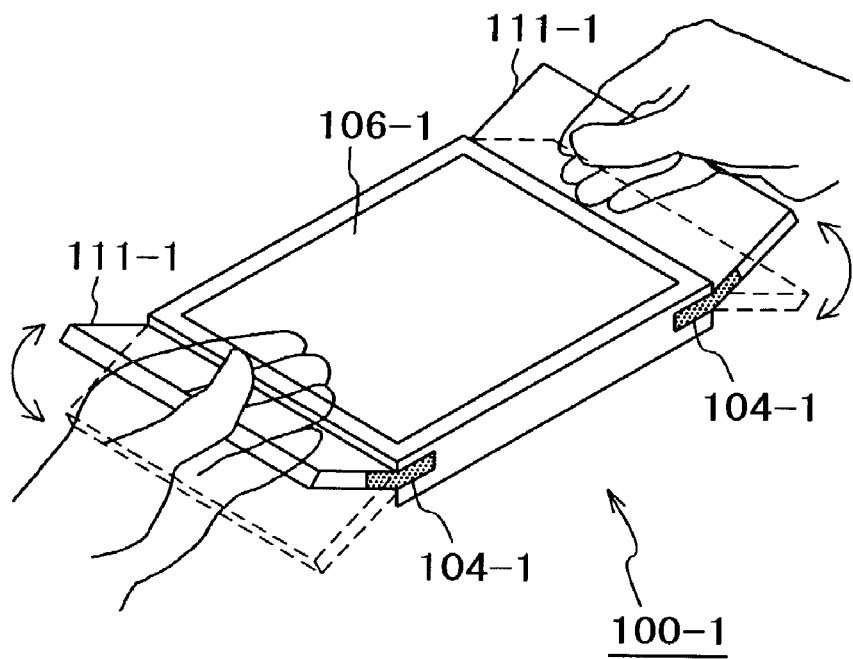
FIG. 19 is a view showing an example of an external construction of the portable apparatus 100-1.

FIG. 19 shows an example of an external construction of the portable apparatus 100-1. In the example, the portable apparatus 100-1 is provided with two operation units 111-1 at right and left sides of the main body of the apparatus 100-1. The operation unit 111-1 is turnably connected with the portable apparatus 100-1 by using a hinge mechanism. In the hinge portion, the rotation sensor 104-1 is placed so as to detect an amount of turning operation of the operation section 111-1 with respect to the main body of the apparatus 100-1.

For example, as shown in the figure, the user may hold the right and left operation sections 111-1 with respective hands, and bend them with respect to the main body of the apparatus 100-1. The amount of turning operation detected by the rotation sensor 104-1 is sent as a gesture input to the processor unit 108-1 via the data acquisition section 107-1. Such gesture input may be performed while confirming display contents of the visual display 106. There is no possibility of having an occlusion problem such that visibility of the display screen is blocked since the user perform the gesture input by holding the right and left sides of the main body of the apparatus 100-1. The gesture of bending the operation section 111-1 with respect to the main body of the apparatus 100-1 may be performed intuitively in response to the user's feeling or impulse, and therefore it is the efficient physical interaction.

Figure 20:
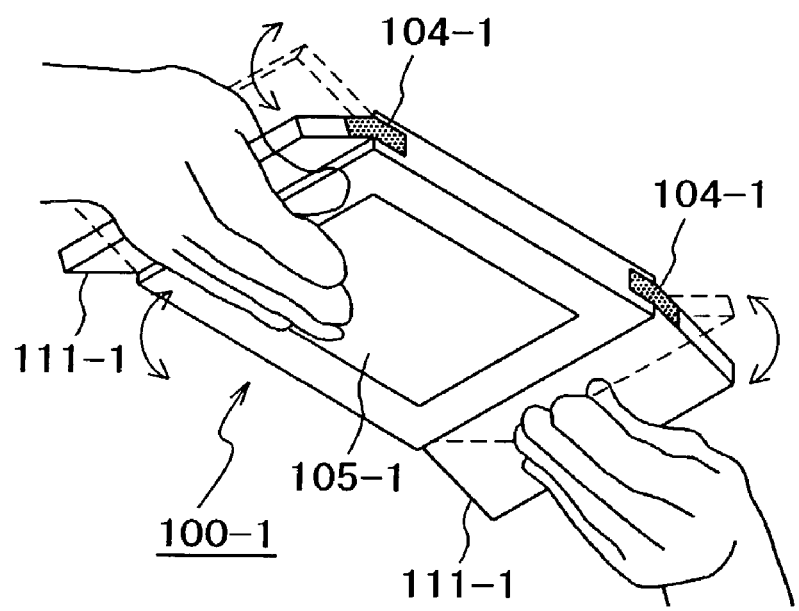
FIG. 20 is a view showing a variation example of the portable apparatus 100-1 shown in FIG. 19.

FIG. 20 shows a variation example of the portable apparatus 100-1 shown in FIG. 19. As shown in FIG. 20, the apparatus 100-1 is provided with the visual display 106-1 placed in the front side of the main body of the apparatus 100-1, and the touch sensor 105-1 placed on the other side, i.e., the back side of the apparatus 100-1. Accordingly, the user can input a two-dimensional coordinate by scanning the back side with a finger while confirming display contents of the display screen placed on the front side of the apparatus 100-1. In this case, the finger would not occlude visibility of the display screen during the coordination input. A GUI operation screen may be set up in the visual display 106-1 of the front side. The GUI operation on the visual display 106-1 may be performed in conjunction with the two-dimensional coordination input detected by the touch sensor 105-1 of the back side by displaying a cursor in the GUI operation screen in response to a position designated by the coordination input.

The processor unit 108-1 transparently processes the gesture input performed with the right and left operation sections 111-1 and the two-dimensional coordination input detected by the touch sensor 105 simultaneously. For example, in an application for displaying a city map, it is possible to perform interactions such that a map displaying position is scrolled in response to the coordination input detected by the touch sensor 105-1 while a display scale of the map is switched in response to the gesture, i.e., the amount of turning operation of the operation section 111-1 (for example, zooming with an increase of the amount of turning operation).

Figure 21A:
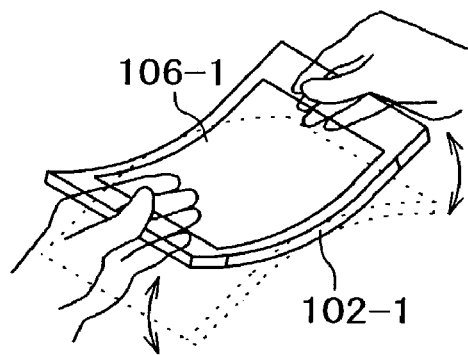
FIGS. 21(A)-21(B) are views showing a variation example of the portable apparatus 100-1 shown in FIG. 19.
Figure 21B:
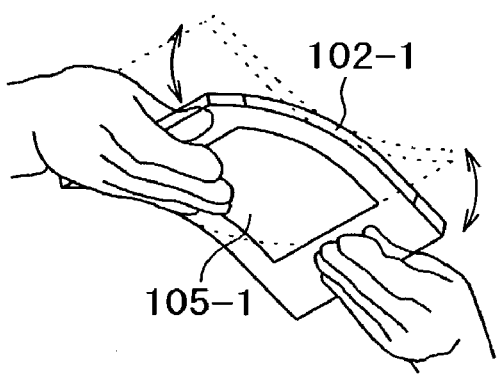

FIG. 21 shows a still another variation example of the portable apparatus 100-1. As shown in FIG. 21, the apparatus 100-1 is provided with the visual display 106-1 placed in the front side of the main body of the apparatus 100-1, and the touch sensor 105-1 placed on the other side, i.e., the back side of the apparatus 100-1. The user can input a two-dimensional coordinate by scanning the back side with a finger while confirming display contents of the display screen placed on the front side of the apparatus 100-1. In this case, the finger would not occlude visibility of the display screen during the coordination input.

Alternatively, a GUI operation screen may be set up in the visual display 106-1 of the front side. The GUI operation on the visual display 106-1 may be performed in conjunction with the two-dimensional coordination input detected by the touch sensor 105-1 of the back side by displaying a cursor in the GUI operation screen in response to a position designated by the coordination input.

In the present variation example, as a detection means of the gesture input, a bending amount applied on the main body of the apparatus 100-1 is utilized instead of the amount of turning operation of the operation section with respect to the main body of the apparatus 100-1. In this case, the physical interaction of the user is measured based on a sensor output of the bend sensor 102-1 included in the apparatus 100-1. Finally, the processor unit 108-1 receives the gesture input via the data acquisition section 107-1.

In the present variation example, the apparatus 100-1 changes its external shape in accordance with the gesture input. Accordingly, the visual display 106-1 may utilize a flexible display such as an organic EL device, and the touch sensor 105-1 may utilize a flexible electrostatic capacitor type mesh sensor.

Figure 22A:
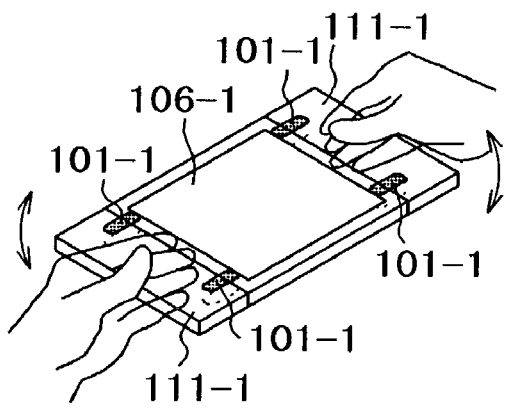
FIGS. 22(A)-22(B) are views showing a variation example of the portable apparatus 100-1 shown in FIG. 19.
Figure 22B:
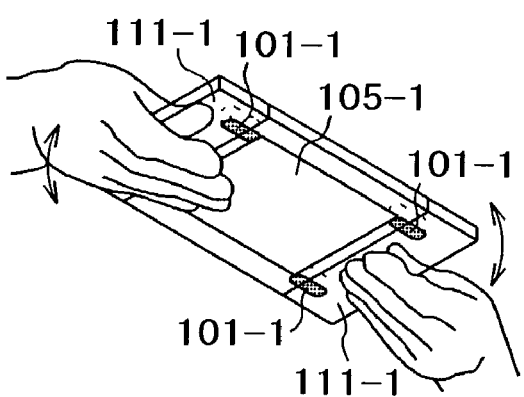

FIG. 22 shows still another variation example of the portable apparatus 100-1. As shown in FIG. 22, the apparatus 100-1 is provided with the visual display 106-1 placed in the front side of the main body of the apparatus 100-1, and the touch sensor 105-1 placed on the other side, i.e., the back side of the apparatus 100-1. The user can input a two-dimensional coordinate by scanning the back side with a finger while confirming display contents of the display screen placed on the front side of the apparatus 100-1. In this case, the finger would not occlude visibility of the display screen during the coordination input.

Alternatively, a GUI operation screen may be set up in the visual display 106-1 of the front side. The GUI operation on the visual display 106-1 may be performed in conjunction with the two-dimensional coordination input detected by the touch sensor 105-1 of the back side by displaying a cursor in the GUI operation screen in response to a position designated by the coordination input.

In the variation example of FIG. 22, the portable apparatus 100-1 is provided with two operation sections 111-1 that are connected to right and left sides of the main body of the apparatus 100-1 via the force sensor 101-1. The force sensor 101-1 detects the gesture input when the user applies force so as to bend the apparatus 100-1. Accordingly, the user can transparently perform the gesture input at the same time the coordination input by holding the apparatus 100-1 with both hands and pressing thumbs while viewing the visual display 106-1. The gesture of bending the apparatus 100-1 may be performed intuitively in response to the user's feeling or impulse, and therefore it is the efficient physical interaction. In the present variation example, it is not necessary to utilize a flexible display for the visual display 106-1 since there would be no distortion of the apparatus 100-1 in response to the gesture input.

Figure 23A:
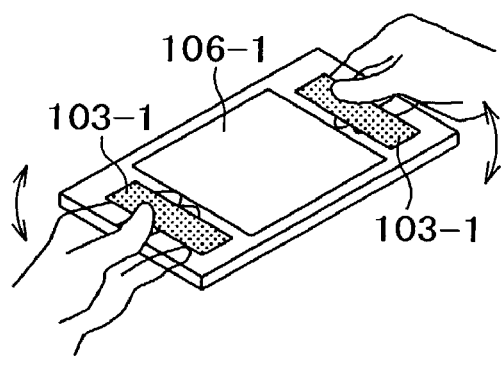
FIGS. 23(A)-23(B) are views showing a variation example of the portable apparatus 100-1 shown in FIG. 19.
Figure 23B:
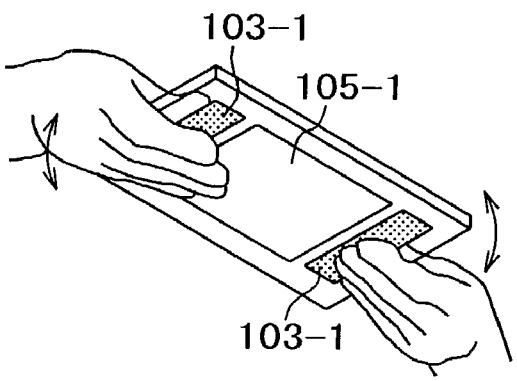

FIG. 23 shows another variation example of the portable apparatus 100-1. As shown in FIG. 23, the apparatus 100-1 is provided with the visual display 106-1 placed in the front side of the main body of the apparatus 100-1, and the touch sensor 105-1 placed on the other side, i.e., the back side of the apparatus 100-1. The user can input a two-dimensional coordinate by scanning the back side with a finger while confirming display contents of the display screen placed on the front side of the apparatus 100-1. In this case, the finger would not occlude visibility of the display screen during the coordination input.

Alternatively, a GUI operation screen may be set up in the visual display 106-1 of the front side. The GUI operation on the visual display 106-1 may be performed in conjunction with the two-dimensional coordination input detected by the touch sensor 105-1 of the back side by displaying a cursor in the GUI operation screen in response to a position designated by the coordination input.

In the variation example of FIG. 23, as a detection means of the gesture input, the pressure sensors 103-1 are placed in both front and back sides of right and left edge portions of the apparatus 100-1's main body. The pressure sensor 103-1 detects pressure applied by a thumb or other fingers if the user holds the edge portions of the apparatus 100-1 by pinching it between the thumb and the rest of fingers, and applies force to bend the apparatus 100-1.

Accordingly, the user can transparently perform the gesture input at the same time the coordination input by pinching the apparatus 100-1 between the thumb and the rest of fingers, and applying force in such a way that a surface of the middle part of the apparatus 100-1 moves upward or downward while holding both right and left edge portions of the apparatus 100-1 and viewing the visual display 106-1. The gesture of bending the apparatus 100-1 may be performed intuitively in response to the user's feeling or impulse, and therefore it is the efficient physical interaction.

In the present variation example, it is not necessary to utilize a flexible display for the visual display 106-1 since there would be no distortion of the apparatus 100-1 in response to the gesture input. Mechanisms realizing the gesture input detection with the pressure sensor 103 are described below with reference to FIGS. 24-25.

Figure 24:
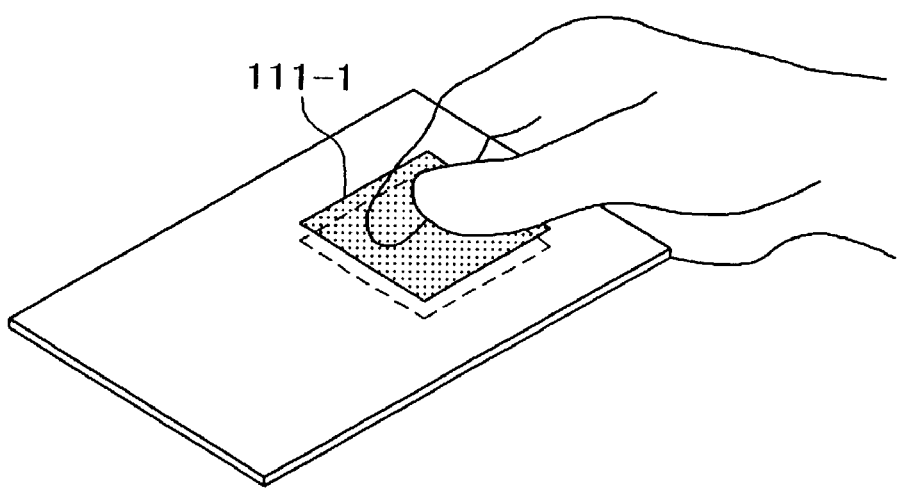
FIG. 24 is a view for an explanation of a mechanism realizing a gesture input using a pressure sensor 103-1.
Figure 25A:
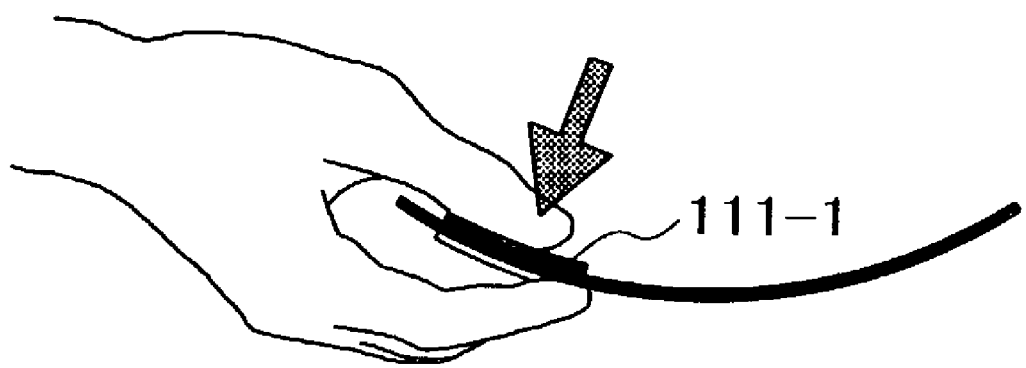
FIGS. 25(A)-25(B) are views for an explanation of a mechanism realizing a gesture input using a pressure sensor 103-1.
Figure 25B:
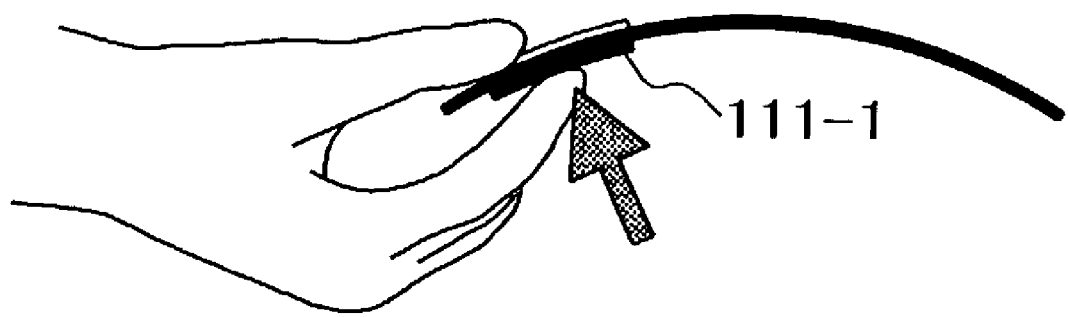

As shown in FIG. 24, two pressure sensors 103-1 are attached on the front surface and the back surface of the main body of the apparatus 100-1. A thumb and an index finger of a hand are touching these pressure sensors 103-1, respectively. The user can apply force in such a way that a surface of the middle part of the apparatus 100-1 moves upward or downward while pinching the apparatus 100-1 between the thumb and the index finger, as shown in FIG. 24. A direction of the force that is being applied on the apparatus 100-1 may be detected based on a difference between sensor outputs of the pressure sensors 103-1, which are placed in the front surface and the back surface, respectively. In other words, the direction of force is determined as downward if the output of the pressure sensor 103-1 placed in the front surface is larger than that of the back surface. Accordingly, it is determined that the downward gesture is performed (see FIG. 25).

Alternatively, the pressure sensor 103-1 may be placed either at the front surface or the back surface to make the configuration simpler. In this case, the application of force may be detected only in one side, and the gesture input is determined according to a size of the pressure detected.

According to the present embodiment, there is provided a computer interface capable of simultaneously performing the coordination input and the force transfer. As shown in FIGS. 20-23, one of the essential features of the portable apparatus 100-1 according to the present embodiment is the touch panel 105-1 placed in the back surface of the apparatus 100-1. According to such a configuration, the user may hold the body of the apparatus 100-1 in natural position, i.e., with both hands gripping respective right and left edge portions of the apparatus 100-1. The user may perform the gesture input by applying force on the main body of the apparatus 100-1 with the hands as well as transparently performing the coordination input by arbitrary moving a finger placed on the touch panel 105-1.

According to such computer interface, complex interactions may be performed with a hand-held type computer without using a keyboard, mouse nor pen. Further, there is no problem of occluding the visibility of the visual display 106-1 of the apparatus 100-1. By combining such computer interface with a portable apparatus that has only a small display, comfortable operation environment may be provided. Preferably, the portable apparatus 100-1 has a form factor that makes it easy for the user to perform the gesture input interaction with applying force on the apparatus' main body while performing another interaction for the coordination input with moving the finger on the touch panel 105-1.

In the portable apparatus 100 in accordance with the present embodiment, a further operation may be performed on a certain position, which is designated in response to the gesture input, at the same time as performing the coordination input on display information or a GUI object provided in the visual display 106-1. Such a simultaneous data input method for the portable apparatus 100 of the present embodiment is described below.

(1) Combination of Coordination Input and Continuous Force Control:

In this case, the user's force applied on the main body of the apparatus is mapped to an analog value in an interface control. For example, when a map is displayed on the visual display 106-1, a map scale may be controlled in accordance with an output of the force sensor 101-1 that detects a user's physical interaction at the same time as indicating a position on the map by using the touch panel 105-1 placed in the back surface of the apparatus 100-1. If an amount of bending resulting from the application of force on the apparatus 100-1 is less than a predetermined value, the map scale displayed on the visual display 106-1 may be increased or decreased based on the sensor output that corresponds to the amount of bending or the force applied. Alternatively, if the apparatus 100-1 has a rigid body and would not distort, in reality, by the application of force, the tactile display 109-1 may be utilized for providing a feedback of the applied force on the apparatus 100-1 to the user by using the analog value detected.

(2) Combination of Coordination Input and Force Control Beyond Threshold Value:

If the user applies force on the apparatus 100-1 and the force is equal or greater than a predetermined threshold value, GUI operations such as issuing a command to the system, switching interface status or operation mode, or the like may be performed. For example, the user may view a menu by moving a selector position to the menu with using the touch panel 105-1. After such selection is completed, the user may perform physical interaction so as to bend the main body of the apparatus 100-1. If force applied through the physical interaction reaches the predetermined threshold, a corresponding menu command may be executed. Alternatively, a notification to the user may be performed with the tactile display 109-1 so as to confirm validity of such physical interaction.

(3) Coordination Input and Gesture Based Force Control:

A force pattern applied on the main body of the apparatus 100 may be recognized and interpreted as a specific command. For example, the user may designate a position in the map displayed on the visual display 106-1 by scanning the touch panel 105-1, and then apply force to bend the apparatus 100 twice in a short period of time, thereby switch a screen display.

Similarly, various gestures may be generated by, for example, bending the main body of the apparatus 100-1 twice or a plural times in the same direction or the opposite direction, or bending at different time, or bending with a predetermined interval. Further, successful interpretation of the physical interaction and successful execution of the corresponding command may be notified to the user by, for example, using the tactile display 109-1.

Figure 26:
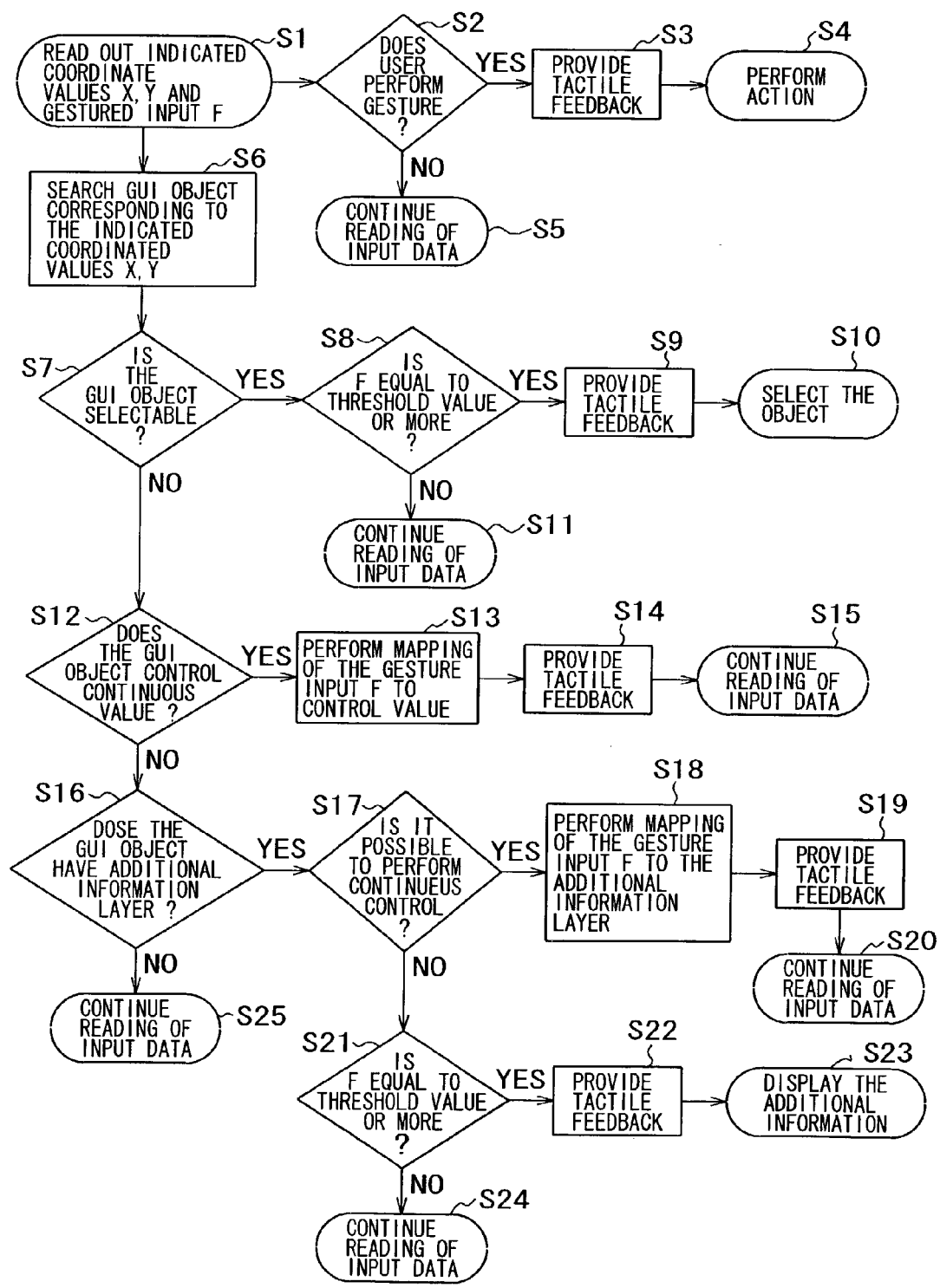
FIG. 26 is a flowchart showing a system operation utilizing the gesture input.

FIG. 26 shows a system operation utilizing the gesture input in flowchart form. Procedures described in the flowchart are realized, in practice, by the processor unit 108-1 that initiates a predetermined program codes, and performs simultaneous and transparent processing of the gesture input and the coordination input through the touch panel 105-1.

First, input coordination values (X,Y) with the touch panel 105-1, and a force F detected by the force sensor 101-1 or a gesture detected by the bend sensor 102-1, the pressure sensor 103-1 and/or the rotation sensor 104-1 are inputted (Step S1). If the user performs the gesture (Step S2), for example, bending the apparatus 100 twice, a tactile feedback is provided to the user using the tactile display 109-1 (Step S3) and a predetermined action is performed such as displaying a menu (Step S4). If no gesture of the user is detected, reading of input data is continued (Step S5). If the coordination input with the touch panel 105-1 is performed, a GUI object corresponding to the coordination input is searched (Step S6).

Next, the designated GUI object is checked if it is a selectable object such as a menu item or hyper link (Step S7). If the designated GUI object is the selectable one, the force F applied on the apparatus 100-1 with the gesture input is checked if it is larger than a predetermined threshold or if a level of the gesture input is larger than a predetermined level (Step S8).

If the force F is larger than the predetermined threshold, the inputted gesture is validated and a command based on the coordination input, such as execution of selected menu or searching of the hyperlink, is issued (Step S10) after a tactile feedback is returned to the user using the tactile display 109-1 (Step S9). If the gesture input is not validated because of less force F than the predetermined threshold, the reading of input data is continued (Step S11).

If it is determined that no selectable object is designated in Step S7, the current GUI object is checked if it has a controllable attribute, such as a scale, color, size or the like, that can be continuously controlled (Step S12). If the GUI object has the continuous controllable attribute, the force F applied on the apparatus 100-1 or any other inputted gesture is mapped to a control value, such as zooming of the map display, or its deviation (Step S13). Subsequently, the tactile feedback is returned to the user using the tactile display 109-1 (Step S14), and then the reading of input data is continued (Step S15).

If the checking in Step S12 results in negative, the designated GUI object is further checked if it has an additional information layer such as help, preview, or any other viewable item (Step S16). If there is the additional information layer, it is checked if the continuous control is possible with the gesture input (Step S17). If the continuous control is possible with the gesture input, the force F applied on the apparatus 100 or any other inputted gesture is mapped to the additional information layer to perform a predetermined action such as zooming in/out (Step S18). Subsequently, the tactile feedback is returned to the user using the tactile display 109-1 (Step S19), and then the reading of input data is continued (Step S20).

If the continuous control with the gesture input is not possible, the force F applied on the apparatus 100-1 is checked if it is greater than a predetermined threshold or if a level of the gesture input is greater than a predetermined level (Step S21). If the force F is greater than the predetermined threshold, the tactile feedback is provided to the user using the tactile display 109-1 (Step S22), and the additional information such as a pop-up help is displayed (Step S23). If the gesture input is not validated because of, for example, an insufficient value of the force F and failure to reach the predetermined threshold, the reading of input data is continued (Step S24). If the designated GUI object is determined to have no additional information in Step S16, the reading of input data is continued (Step S25).

As described above, the gesture input according to the present embodiment may be utilized for interactions for apparatuses of a hand-held type that do not use a mouse, touch display screen nor keyboard. For example, the present embodiment may be applicable to the following applications.

1. Advanced remote control for a display screen.
2. Advanced remote control for a TV receiver system (see FIG. 27).
3. PDA (Personal Digital Assistance) and any other personal information monitor and management.
4. Portable phone.
5. Electronic book.
6. Hand-held type game controller.

FIG. 27 shows a schematic arrangement of a remote controller according to the present embodiment for an AV (Audio Visual) apparatus such as TV receiver, in which the gesture input is utilized. In the present example of FIG. 27, the user applies physical interaction on the remote controller so as to bend the main body thereof upward or downward. When the physical interaction (i.e., force or bend) is applied, an amount of bending, size or pattern of the force may be varied. The remote controller may decode such gesture and convert to data or a command for controlling the main apparatus such as the TV receiver, and the converted data or command is transmitted to the main apparatus.

As described above, according to the present embodiment, there is provided a portable information apparatus that allows the user to perform a complex input operation with rather simpler user actions.

Further, according to the present embodiment, there is provided a portable information apparatus provided with a physical user interface that accepts physical gestures of the user, thereby simplifying the input operation thereof.

According to the present embodiment, there is provided a portable information apparatus capable of transparently combining a plurality of gestures performed by the user and accepting these combined gestures as an input to the apparatus.

Further, according to the present embodiment, there is provided a portable information apparatus that can use physical interactions with the apparatus as a general-purpose interface to the apparatus.

According to the present embodiment, there is provided a computer interface capable of simultaneously interfacing the coordination input and the force input. Such capability of simultaneously accepting multi-dimensional user inputs promotes usability and provides more variations of interactions.

Such combination of the user inputs is advantageous, particularly for a hand-held type or portable type computers, and allows the user to perform a variety of interactions without using a mouse, touch display screen nor keyboard. Further, the interface according to the present embodiment does not interfere with a display screen, thereby the interaction gesture does not block any of display contents in the screen.

According to the interface of the present embodiment, the user may realize interactions regarding different orthogonal information with single gesture. The interactions based on the gestures are intuitive, effective and enjoyable.

According to the interface of the present embodiment, the user may transparently perform the two-dimensional coordination input and the force input at the same time on a small hand-held computer. For example, the single gesture may realize an interaction of scrolling a city map while simultaneously changing a scale of the map.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A user interface apparatus having a flexible part, comprising:
    an analogue sensor for sensing distortion of the flexible part, the analogue sensor comprising a pair of pressure sensors,
    means for detecting one of a plurality of first-type input states based on a value of the distortion sensed by the analogue sensor and having a task run, the task being related to a selected first-type input state, wherein the means for detecting detects a direction of force applied to the pair of pressure sensors to cause distortion of the flexible part, wherein
    the plurality of first-type input states are respectively related to different distortion statuses of the flexible part,
    a two-dimensional position sensor, distinct from and used in conjunction with the analogue sensor, for sensing at least one of a user touch position in a two-dimensional plane and/or a direction of movement of the user touch position; wherein at least one of the tasks is for controlling at least one graphical user interface object; and
    means for selecting a view of a plurality items based on the analogue sensor sensing a distortion status of the flexible part greater than a predetermined value.

2. The user interface apparatus according to claim 1, wherein one of the plurality of first-type input states is related to a neutral state of the flexible part in which no distortion is detected.

3. The user interface apparatus according to claim 1, wherein:
    the present user interface apparatus is configured as an electric device of a single body including a flexible display panel as the flexible part, and
    the two-dimensional position sensor is disposed on the back of the flexible display panel.

4. An apparatus including a user interface unit, wherein the user interface unit includes the user interface apparatus according to claim 1 and one or a plurality of additional input devices.

5. The user interface apparatus according to claim 1, wherein a first level of a hierarchical structured menu includes a plurality of individually selectable characters and a second level of said hierarchical structured menu includes a different plurality of individually selectable characters.

6. The user interface apparatus according to claim 1, wherein the graphical user interface object is for a hierarchical structured menu, the depth of the hierarchical structured menu is selected by said first-type input states, and an item of the menu at the selected depth is selected by said touch position.

7. The user interface apparatus according to claim 1, including means for changing a transparency value of an integrated preview of an item based on the analogue sensor sensing a distortion status of the flexible part.

8. The user interface apparatus according to claim 1, including means for changing a zoom value of an integrated preview of an item based on the analogue sensor sensing a distortion status of the flexible part.

9. An apparatus configured to have a single body including a processing unit and a display unit, the apparatus comprising:
    an analogue sensor disposed on the body for detecting user's analogue input applied on the body of the apparatus, the analogue sensor comprising a pair of pressure sensors,
    wherein the user's analogue input corresponds to distortion of a flexible portion of the single body,
    wherein the analogue sensors are disposed on the body for detecting a direction of force applied to the body to cause distortion of the flexible portion,
    wherein the processing unit changes a screen view of a plurality of items displayed on the display unit based on an output value of the analogue sensor where the output value is greater than a predetermined value, and
    a two-dimensional position sensor, distinct from and used in conjunction with the analogue sensor, for sensing at least one of a user touch position in a two-dimensional plane and/or a direction of movement of the user touch position; wherein the processing unit changing the screen view includes controlling at least one graphical user interface object.

10. The apparatus according to claim 9, wherein:
    the screen view to be changed includes an image superposed on an existing view, and
    the processing unit changes one of visual properties of the superposed image in accordance with the output value of the analogue sensor, and wherein the image replaces the existing view on the display unit.

11. The apparatus according to claim 9, wherein
    the screen view to be changed includes an image that enables to provide a visual impression to a user that the image indicates selectable items and an item selected, and
    the processing unit changes selectable items and an item selected included in the image in accordance with the output value of the analogue sensor.

12. The apparatus according to claim 9, further comprising:
    scroll means for controlling scrolling of the screen view in accordance with user's input,
    wherein the user's input is input via the two-dimensional position sensor or the analogue sensor, and
    wherein the processing unit selects one of selectable graphic user interface elements displayed in a current screen view by detecting if a position of the graphic user interface element is reached to a predetermined position of a screen of the display unit, and switches a mode of operation so as to accept a user input for confirming selection of the detected element.

13. The apparatus according to claim 9, wherein graphical user interface object is for a hierarchical structured menu, wherein the depth of the hierarchical structured menu is selected in accordance with input from the analogue sensor, and an item of the menu at the selected depth is selected in accordance with input from the two-dimensional position sensor.

14. The apparatus according to claim 9, wherein the processing unit changes a transparency value of an integrated previous of an item based on the analogue sensor sensing a distortion status of the flexible part.

15. The apparatus according to claim 9, including means for changing a zoom value of an integrated preview based on the analogue sensor sensing a distortion status of the flexible part.

16. An apparatus configured to have a single body including a processing unit and a display unit, the apparatus comprising:
    an analogue sensor disposed on the body for detecting user's analogue input applied on the body of the apparatus, the analogue sensor comprising a pair of pressure sensors disposed on the body for detecting a direction of force applied to the body, and
    a two-dimensional position sensor, distinct from and used in conjunction with the analogue sensor, for sensing at least one of a user touch position in a two-dimensional plane and a direction of movement of the user touch position;
    wherein the processing unit comprises an image processing unit having a plurality of operation modes to generate a screen view of a plurality of items displayed on the display unit, and
    wherein the processing unit controls functionality of at least one of the operation modes based on an output value of the analogue sensor being greater than a predetermined value, and
    wherein the processing unit causes an image to be superimposed over a portion of the screen view based on the output value of the analogue sensor; and
    wherein the processing unit causes the image to replace the screen view on the display unit; wherein the processing unit controls at least one graphical user interface object.

17. The user interface apparatus according to claim 16, wherein the screen view and the image are non-identical portions of a map.

18. The apparatus according to claim 16, wherein graphical user interface object is for a hierarchical structured menu in accordance with an analogue input from the analogue sensor and a touch position input from the two-dimensional touch position sensor, the depth of the hierarchical structured menu being controlled by said analogue input, and an item of the menu at the selected depth being controlled by said touch position input.

19. The user interface apparatus according to claim 16, wherein the processing unit changes a transparency value of an item based on the analogue sensor sensing a distortion status of the flexible part.

20. The user interface apparatus according to claim 16, wherein the processing unit changes a zoom value of an integrated preview based on the analogue sensor sensing a distortion status of the flexible part.

21. A portable information apparatus operated in response to a user input, comprising:
    a main body;
    gesture input means for obtaining physical interaction applied on the main body by a user, wherein the physical interaction applied on the main body causes the main body to bend, the gesture input means comprising an analogue sensor, the analogue sensor comprising a pair of pressure sensors for detecting a direction of force applied to cause distortion in an operation section with respect to the main body;
    processing means for executing processing in accordance with the user input,
    a visual display for visually displaying a result of the processing by the processing means,
    direction input means, distinct from and used in conjunction with the gesture input means, for inputting a direction in a display screen of the visual display in response to an operation performed with a user's finger; wherein the processing means controls at least one graphical user interface object; and
    selecting means for selecting a view of a plurality items based on the analogue sensor sensing a distortion status of the flexible part greater than a predetermined value.

22. The portable information apparatus according to claim 21, wherein
    the visual display is placed in a front surface of the main body and
    the direction input means is placed in a back surface of the main body.

23. The portable information apparatus according to claim 21, further comprising a tactile presentation section for providing a tactile feedback indicating a processing result obtained in the processing means.

24. The portable information apparatus according to claim 21, wherein the gesture input means comprises:
    operation sections turnably connected to both right and left edge portions of the main body, respectively;
    a rotation sensor for detecting an operation amount of turning at least one of the operation sections with respect to the main body; and
    a data acquisition section for providing an output of the rotation sensor, as a gesture input, to the processing means.

25. The portable information apparatus according to claim 21, wherein:
    the main body is flexible; and
    the gesture input means comprises a bend sensor for detecting an amount of bend in the main body caused by the physical interaction by the user, and a data acquisition section for providing an output of the bend sensor, as a gesture input, to the processing means.

26. The portable information apparatus according to claim 25, wherein the bend sensor detects a direction of bending in the main body in addition to the amount thereof.

27. The portable information apparatus according to claim 25, further comprising:

a flexible visual display, which is placed in a front surface of the main body, for visually displaying a result of the processing by the processing means; and a flexible direction input means, which is placed in a back surface of the main body, for inputting a direction in response to an operation performed with a users finger.

28. The portable information apparatus according to claim 21, wherein the gesture input means comprises:

operation sections attached to both right and left edge portions of the main body, respectively;

a force sensor for detecting force applied to cause distortion in at least one of the operation sections with respect to the main body; and a data acquisition section for providing an output of the force sensor, as a gesture input, to the processing means.

29. The portable information apparatus according to claim 28, wherein the force sensor detects a value and a direction of the force applied on the main body.

30. The portable information apparatus according to claim 21, wherein the gesture input means comprises:

a data acquisition section for providing an output of the pressure sensors, as a gesture input, to the processing means.

31. The portable information apparatus according to claim 30, wherein the pressure sensors are placed in both front and back surfaces of the main body, and detects pressure applied by the user, who is holding both right and left edge portions of the main body, so as to cause upward and/or downward bending in the main body.

32. The portable information apparatus according to claim 21, wherein the visual display is placed in a front surface of the main body; and wherein the processing means simultaneously and transparently processes the gesture input from the gesture input means and the direction input from the direction input means.

33. The portable information apparatus according to claim 32, wherein the processing means performs a process, (which corresponds to the physical interaction accepted by the gesture input means, to an object in the display screen, the object being designated by using the direction input means.

34. The portable information apparatus according to claim 21, wherein:

the gesture input means comprises a force sensor for detecting a strength of the physical interaction applied on the main body by the user; and the processing means uses an output of the force sensor, which is a continuous variable, as an analogue value for interface control.

35. The portable information apparatus according to claim 34, further comprising a tactile presentation section for providing a tactile feedback to the user, the tactile feedback indicating the analogue value accepted by the gesture input means.

36. The portable information apparatus according to claim 21, wherein:

the gesture input means comprises a force sensor for detecting a strength of the physical interaction applied on the main body by the user; and the processing means controls a system operation in response to an output of the force sensor if the output of the force sensor exceeds a predetermined threshold.

37. The portable information apparatus according to claim 36, further comprising a tactile presentation section for providing a tactile feedback to the user so as to confirm validity of the physical interaction accepted by the gesture input means.

38. The portable information apparatus according to claim 21, wherein:

the gesture input means comprises a force sensor for detecting a strength of the physical interaction applied on the main body by the user; and the processing means analyzes a pattern of the force detected by the force sensor, and uses the pattern of the force as a specific command.

39. The portable information apparatus according to claim 38, further comprising a tactile presentation section for providing a tactile feedback to the user so as to confirm successful analysis of the physical interaction accepted by the gesture input means and corresponding successful execution of the specific command.

40. The portable information apparatus according to claim 21, wherein graphical user interface object is for a hierarchical structured menu, the depth of the hierarchical structured menu being selected by gesture input from said gesture input means, and an item of the menu at the selected depth being selected by direction input from said direction input means.

41. The portable information apparatus according to claim 21, wherein the processing means changes a transparency value of an item based on the gesture input means sensing a distortion status of the flexible part.

42. The portable information apparatus according to claim 21, wherein the processing means changes a zoom value of an integrated preview based on the gesture input means sensing a distortion status of the flexible part.

* * * * *